(12) United States Patent
Hites

(10) Patent No.: US 8,096,401 B2
(45) Date of Patent: Jan. 17, 2012

(54) MECHANICAL PALLET LIFT INCORPORATED INTO AN ASSEMBLY LINE PROCESS

(75) Inventor: Charles L. Hites, Fraser, MI (US)

(73) Assignee: BAE Industries, Inc., Warren, MI (US)

( * ) Notice: Subject to any disclaimer, the term of this patent is extended or adjusted under 35 U.S.C. 154(b) by 283 days.

(21) Appl. No.: 12/560,691

(22) Filed: Sep. 16, 2009

(65) Prior Publication Data

US 2011/0061991 A1    Mar. 17, 2011

(51) Int. Cl.
*B65G 37/00* (2006.01)
(52) U.S. Cl. ................... 198/346.2; 198/468.8
(58) Field of Classification Search ............... 198/346.1, 198/346.2, 345.3, 468.8
See application file for complete search history.

(56) References Cited

U.S. PATENT DOCUMENTS

| | | | |
|---|---|---|---|
| 3,905,632 A | 9/1975 | Caylor et al. | |
| 4,421,225 A * | 12/1983 | Hetman, Jr. ................ | 198/346.2 |
| 4,431,103 A * | 2/1984 | Sekii ......................... | 198/345.3 |
| 5,002,175 A | 3/1991 | Drexel et al. | |
| 5,775,479 A * | 7/1998 | Carle ......................... | 198/468.8 |
| 5,985,029 A | 11/1999 | Purcell | |
| 6,481,558 B1 * | 11/2002 | Bonora et al. ............. | 198/346.2 |
| 7,073,631 B2 | 7/2006 | Ludwig et al. | |
| 7,862,284 B2 * | 1/2011 | Kiriyama ................... | 198/346.2 |
| 2005/0029053 A1 | 2/2005 | Wirzberger et al. | |

FOREIGN PATENT DOCUMENTS

WO    WO-2006005450 A1    1/2006

\* cited by examiner

*Primary Examiner* — James R Bidwell
(74) *Attorney, Agent, or Firm* — Gifford, Krass, Sprinkle, Anderson & Citkowski, P.C.

(57) ABSTRACT

A mechanical pallet lift, such as incorporated into a conveyor driven process, having a base. A lower frame is displaceably supported upon the base and includes a first plurality of upwardly extending and spaced apart walls. An upper frame includes a second plurality of downwardly extending and spaced apart walls which nest in offsetting fashion with the first plurality of walls in an initial position. A rotary driven crank includes a first linkage elevating the upper frame so that the second walls are located above the first walls, a second linkage successively displacing the lower frame to cause the first walls to align with the second walls concurrent with the first linkage reverse lowering the upper frame to seat upon the lower frame. A limit stroke bracket surrounds the base includes column supports which, upon shifting in the elevated position, are engaged by horizontal exterior supports mounted to said upper frame upon reverse actuating of said crank at an intermediate elevated position.

20 Claims, 25 Drawing Sheets

MECHANICAL PALLET LIFT INCORPORATED INTO AN ASSEMBLY LINE PROCESS

FIELD OF THE INVENTION

The present invention relates to a mechanical pallet lift for supporting, upon a surface thereof, one or more parts. The pallet lift is typically incorporated into a conveyor driven assembly line process and includes a built-in Geneva style crank mechanism incorporated into a supporting base which is operated by a rotary cylinder and which, in combination with upper and lower frame assemblies, operates to elevate the upper frame assembly to a first maximum height in order to facilitate stamping and other mechanical forming operations performed on the supported parts. A generally "U" shaped limit stroke bracket includes first and second pairs of column supports positioned beyond the perimeter of the lower frame assembly. The upper frame assembly includes projecting crosswise supports such that, upon actuating a pivot handle to linearly displace the column supports, the Geneva crank mechanism is return actuated to descend the upper frame assembly to a second intermediate height position at which the crosswise supports engage the column supports.

BACKGROUND OF THE INVENTION

Mechanical pallet lifting devices are known in the art and such as which can be incorporated into a manufacturing type process. One known pallet lift mechanism incorporates provision of a pair of pancake-type air cylinders. Another known device for providing controlled lifting and positioning of a plate-like workpiece carrier and including rails located on opposites sides of a conveying path associated with the carrier is set forth in U.S. Pat. No. 5,002,175, to Drexel. In each case, the prior art requires the provision of multiple cylinders to effectuate repetitive lift cycling of the workpiece supporting surface.

SUMMARY OF THE INVENTION

The present invention discloses a mechanical pallet lift incorporated into a conveyor driven process and which includes a single lift cylinder component which replaces the requirement of multiple cylinders associated with prior art designs. A planar base is provided and upon which is mounted a rotary driven crank. A lower frame is supported upon the base and includes a first plurality of upwardly extending and spaced apart walls.

An upper frame includes a second plurality of downwardly extending and spaced apart walls which nest in offsetting fashion with the first plurality of walls in an initial position, as well as being aligned with and supported upon the first plurality of walls in an elevated position. An uppermost platen surface is supported upon the upper frame, and against which is affixed one or more workpieces. Outer rails are associated with the conveyor assembly and between is located the pallet lift.

The crank is operated by such as a rotary drive cylinder and includes a first linkage elevating the upper frame between the initial and elevated positions, a second linkage successively displaces the lower frame so that the first plurality of walls align with the second plurality of walls and prior to the first linkage lowering the upper frame to seat upon the lower frame.

Additional features include an interior aperture defined in the lower frame for situating therein the crank, a pair of biasing springs extending horizontally inwardly from an end projection associated with the base and biasing the lower frame in a direction opposing the direction of travel of the second linkage. The first linkage further includes a lower rotary driven arm and an upper pivotally engaged arm, an extending end of the upper arm pivotally engaging an underside located projection of the upper frame. The second linkage includes a rotary driven and generally elongate member exhibiting an arcuate end surface, and which is coaxially mounted in both an outward and angularly offset fashion relative the rotary driven arm of the first linkage.

A generally boomerang shaped transfer linkage pivotally secured at a location above the planar base and including an upper portion contacted by the rotary driven elongate member, the transfer linkage further including a lower portion engaging the lower frame and which further includes a recessed outer surface within which is seated a surface supported and horizontally extending pin affixed to the lower frame.

A "U" shaped limit stroke bracket is displaceably supported upon the planar base and includes spaced apart sides each supporting a pair of column supports located outward the lower frame. The upper frame includes an equal number of projecting crosswise supports secured horizontally to side edges of selected downwardly extending and spaced apart walls and such that, upon linearly displacing the limit stroke bracket following the upper frame being displaced to the elevated position, the column supports aligning underneath the crosswise supports, following which return actuating of the crank causes the horizontally extending crosswise supports to seat upon the column supports to reposition the upper frame at an intermediate elevated position.

The limit stroke bracket further includes a central elongate portion interconnecting the spaced apart sides, a linearly displaceable rod associated with a cam pivoting handle mechanism being affixed to the base, with the rod connecting to elongate portion. Upon pivoting the handle with is supported by an angled bracket associated with the base, the cam causes the limit stroke bracket with column supports to displace underneath the horizontal crosswise supports and prior to reverse actuating of the crank.

Other features include a pair of vertical guide posts projecting from the base and aligning through seating locations associated with the upper and lower frames. First and second vertically extending cushioning springs extend upwardly from the base and seating through apertures defined in underside secured guide posts associated with the upper frame and, in combination with the guide posts, providing for repetitive raising and lowering of the upper frame.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the illustrations described below, the present invention discloses a pallet lift assembly incorporating a single cylinder actuated drive component and which, in combination with the novel and unique construction of the lift assembly provides for multi-position adjustment of a workpiece supporting surface associated with the lift.

Figure 1:
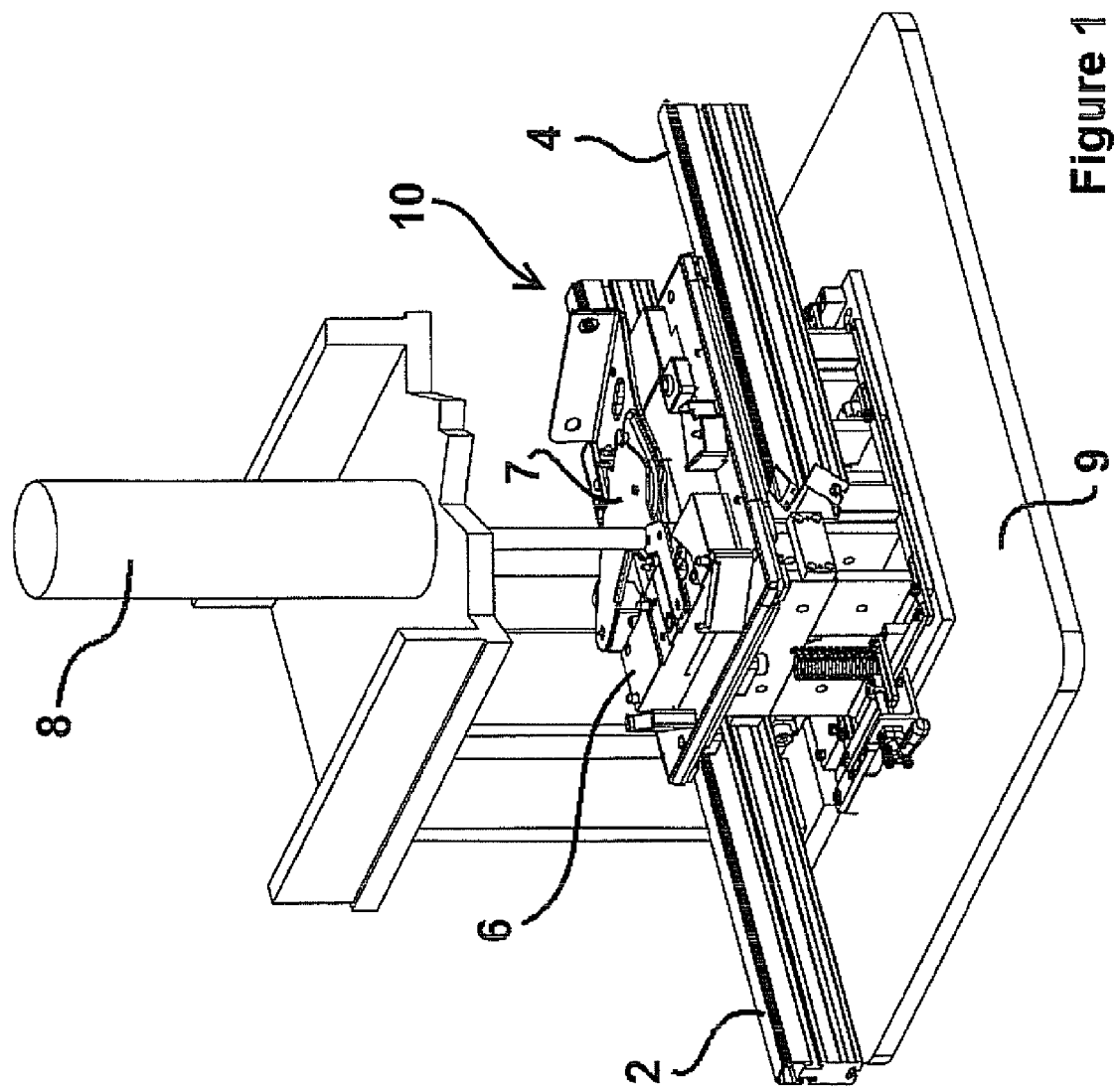
FIG. 1 is an assembled environmental perspective of the pallet lift assembly according to the present inventions.

FIG. 1 is an assembled environmental perspective of the pallet lift assembly 10 (see also overall exploded view of FIG. 3), and illustrates a pair of outer rails, at 2 and 4, such as which are associated with a conventional conveyor driven process and within which the lift assembly 10 can be situated. An upper platen (or anvil) surface is further shown at 6, this being associated with the upper frame component of the assembly as will be further described, upon which is secured one or more workpieces, see at 7, these in turn being worked upon at an operation associated with the conveyor, such as further illustrated at press 8. The overall assembly 10 is further capable of being situated upon a floor or other desired anchoring support location, at 9.

Figure 2:
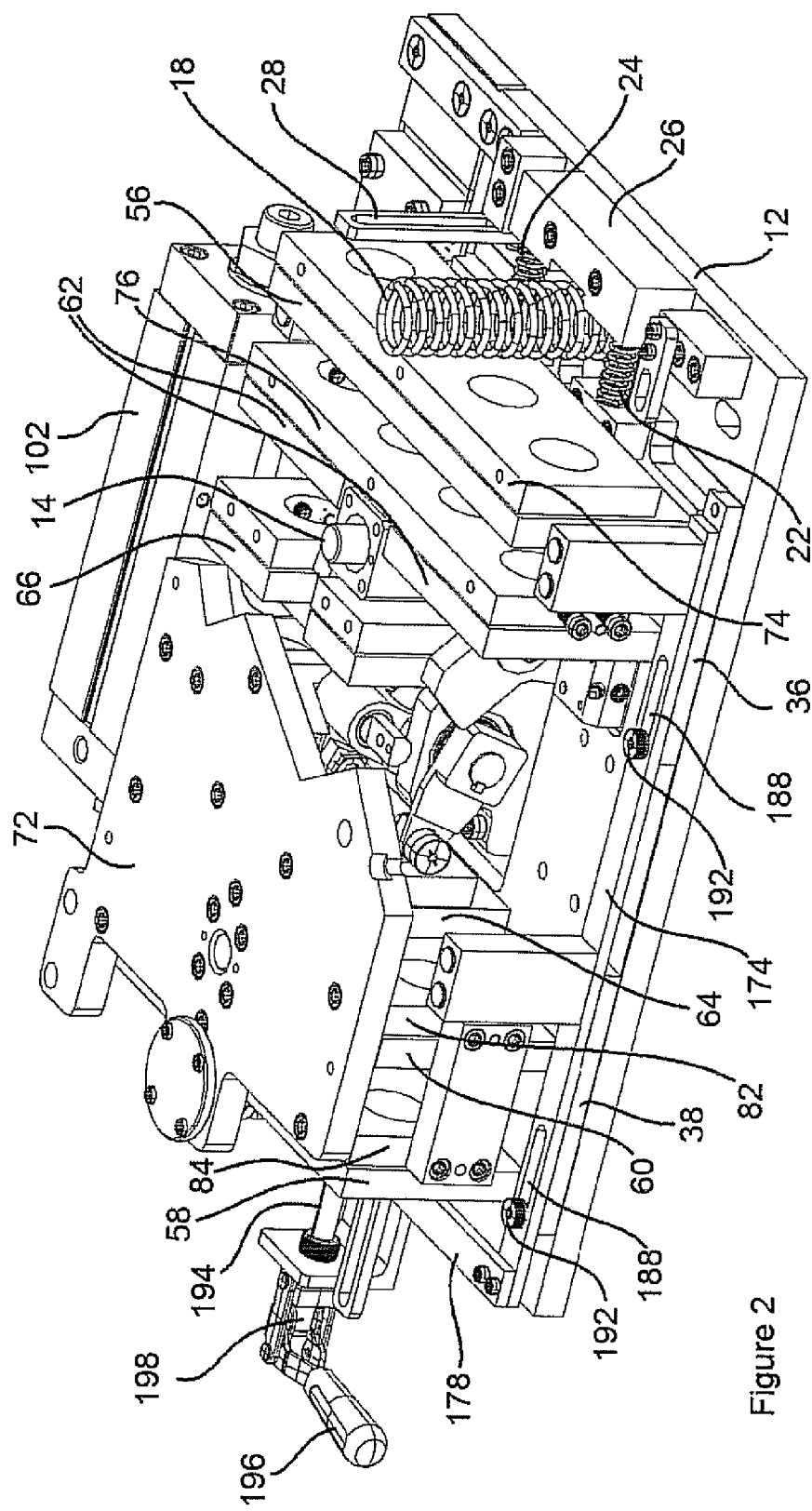
FIG. 2 is partial cutaway of the lift mechanism and illustrating the configuration of the crank mechanism and rotary drive cylinder for effectuating combined lifting of the upper frame and succeeding lateral displacement of the lower frame in order to support the upper platen surface at an elevated position.
Figure 3:
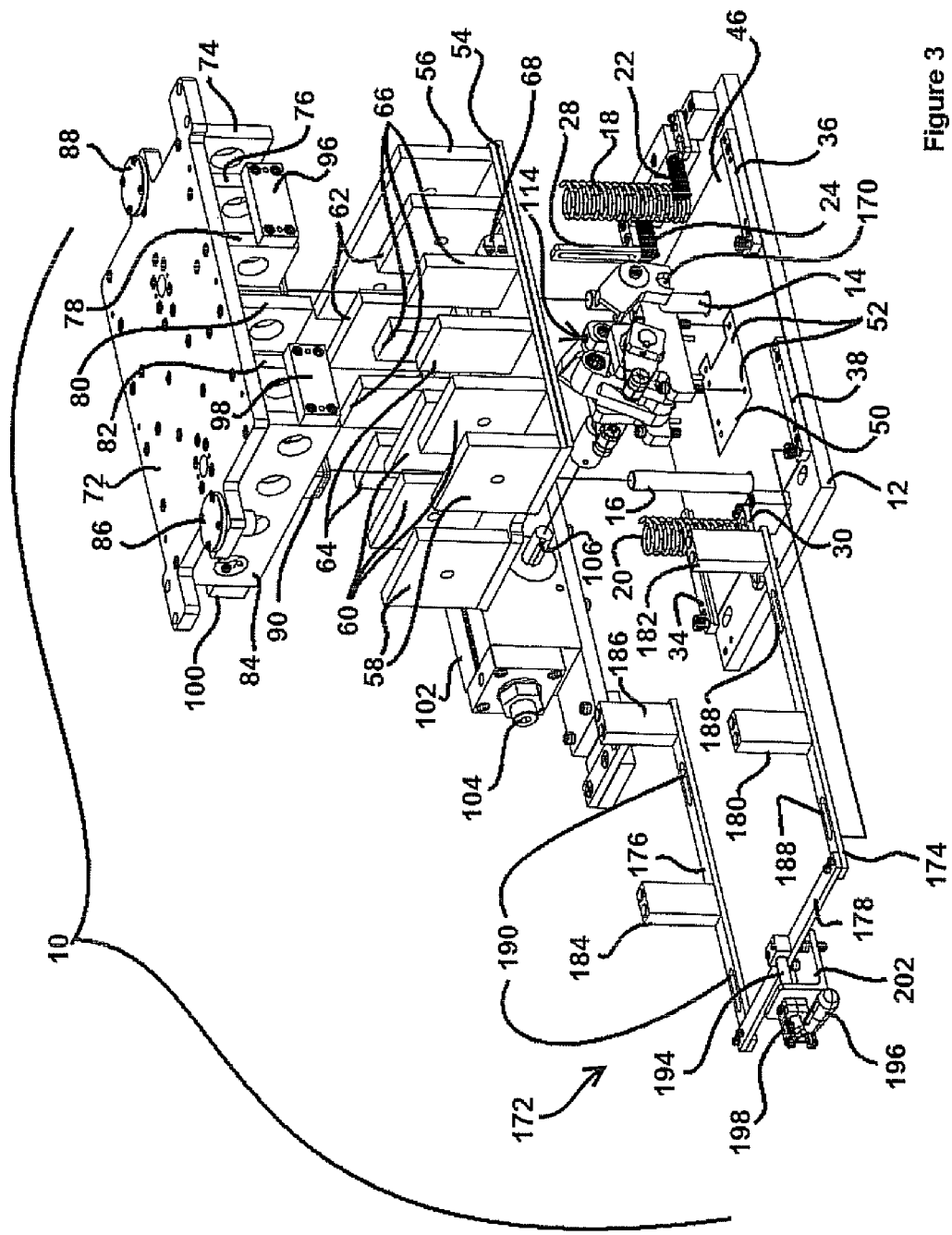
FIG. 3 is an overall exploded view of the pallet lift mechanism.
Figure 14:
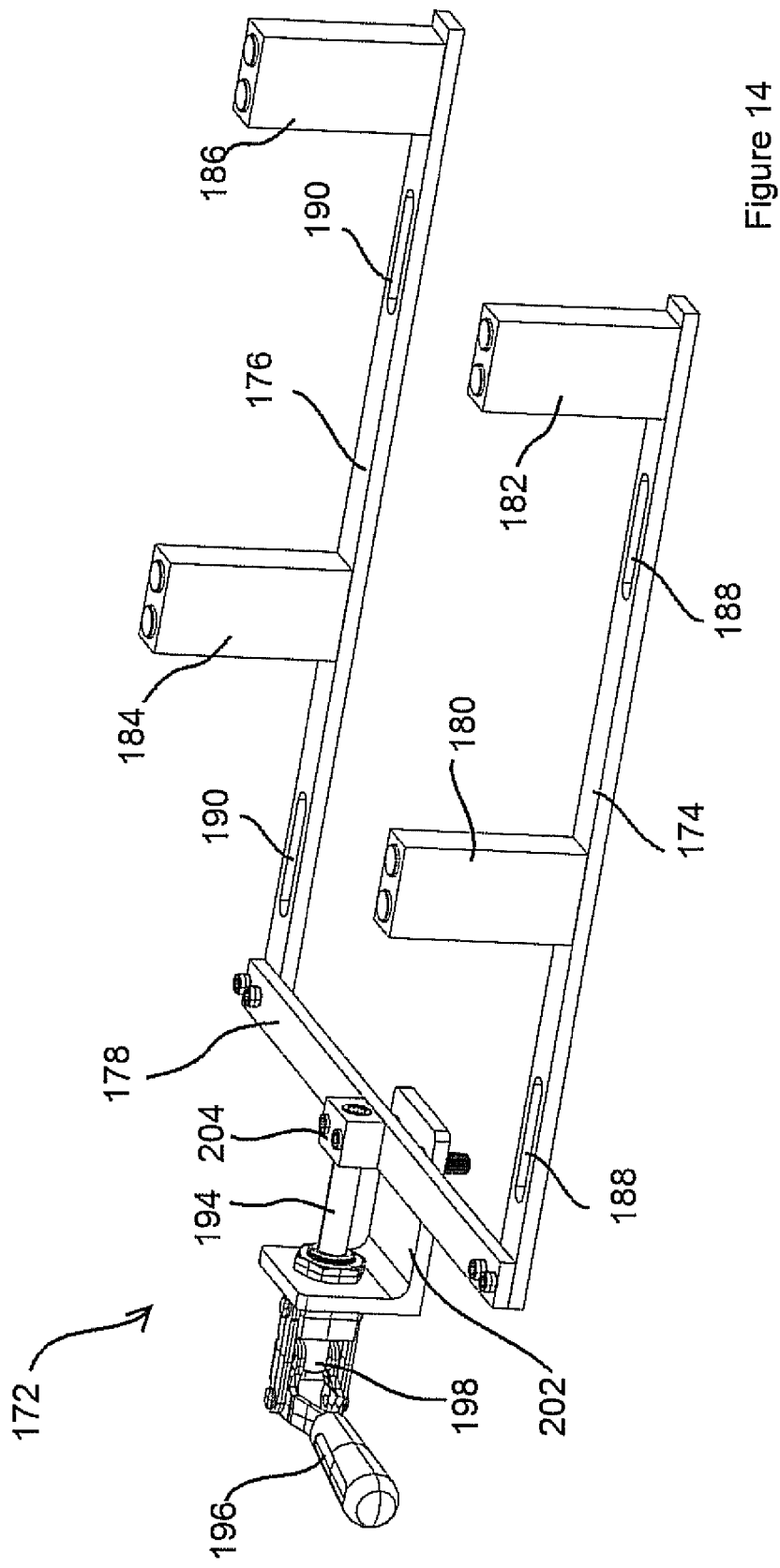
FIG. 14 is a perspective view of the limit stroke bracket subassembly.
Figure 15:
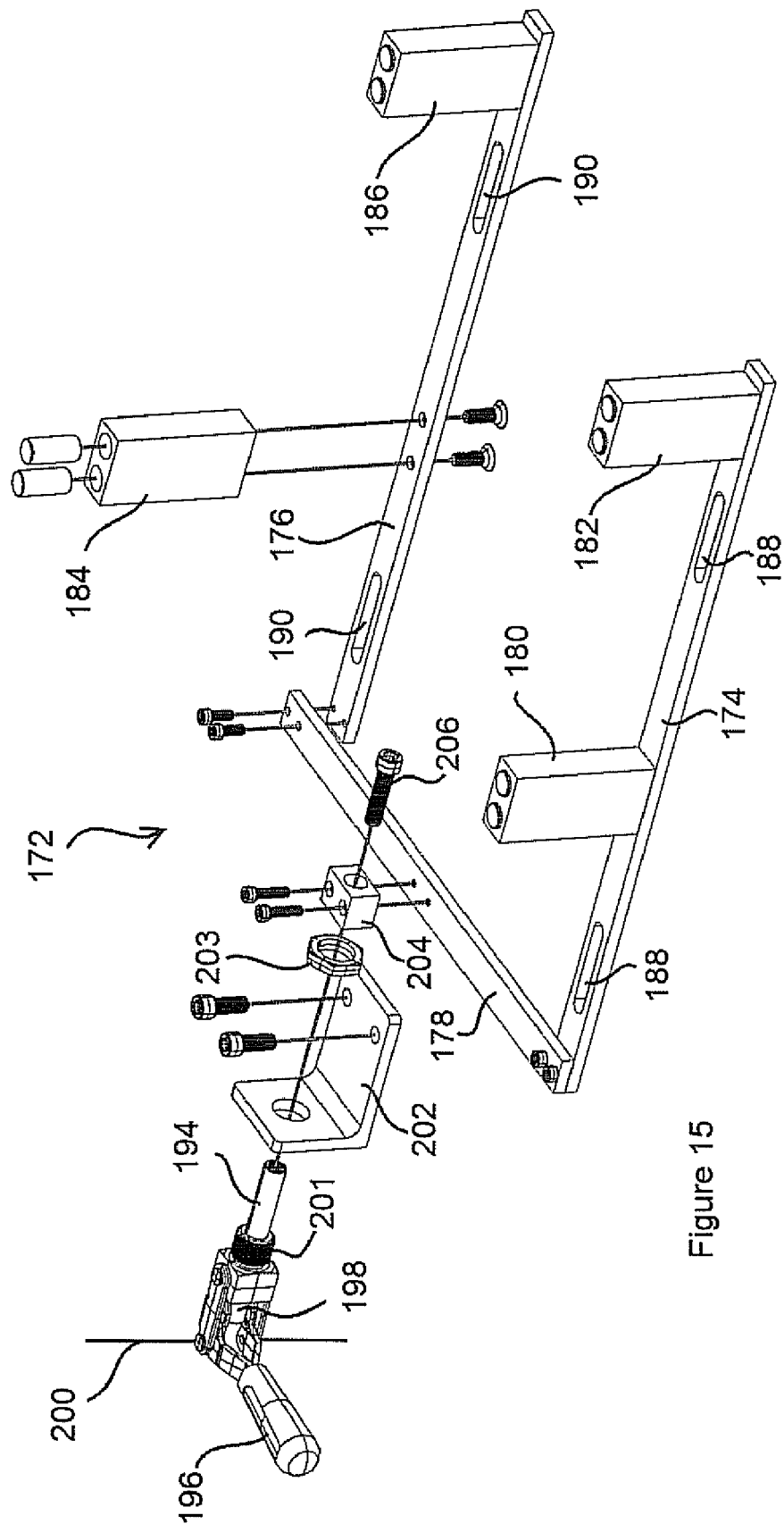
FIG. 15 is an exploded perspective of the limit stroke bracket subassembly.
Figure 16:
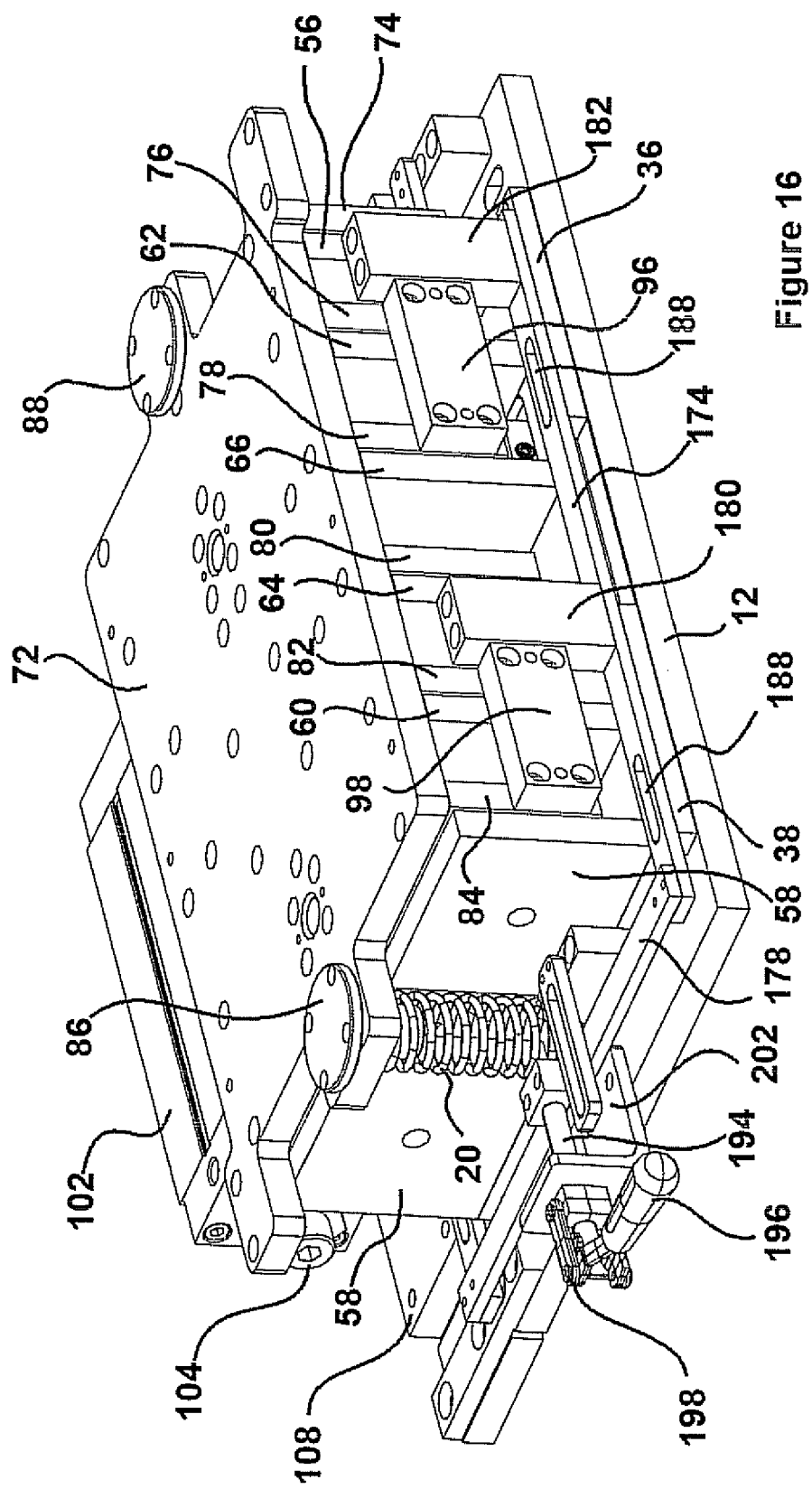
FIG. 16 is a perspective assembled view of the pallet lift assembly in an initial position.
Figure 17:
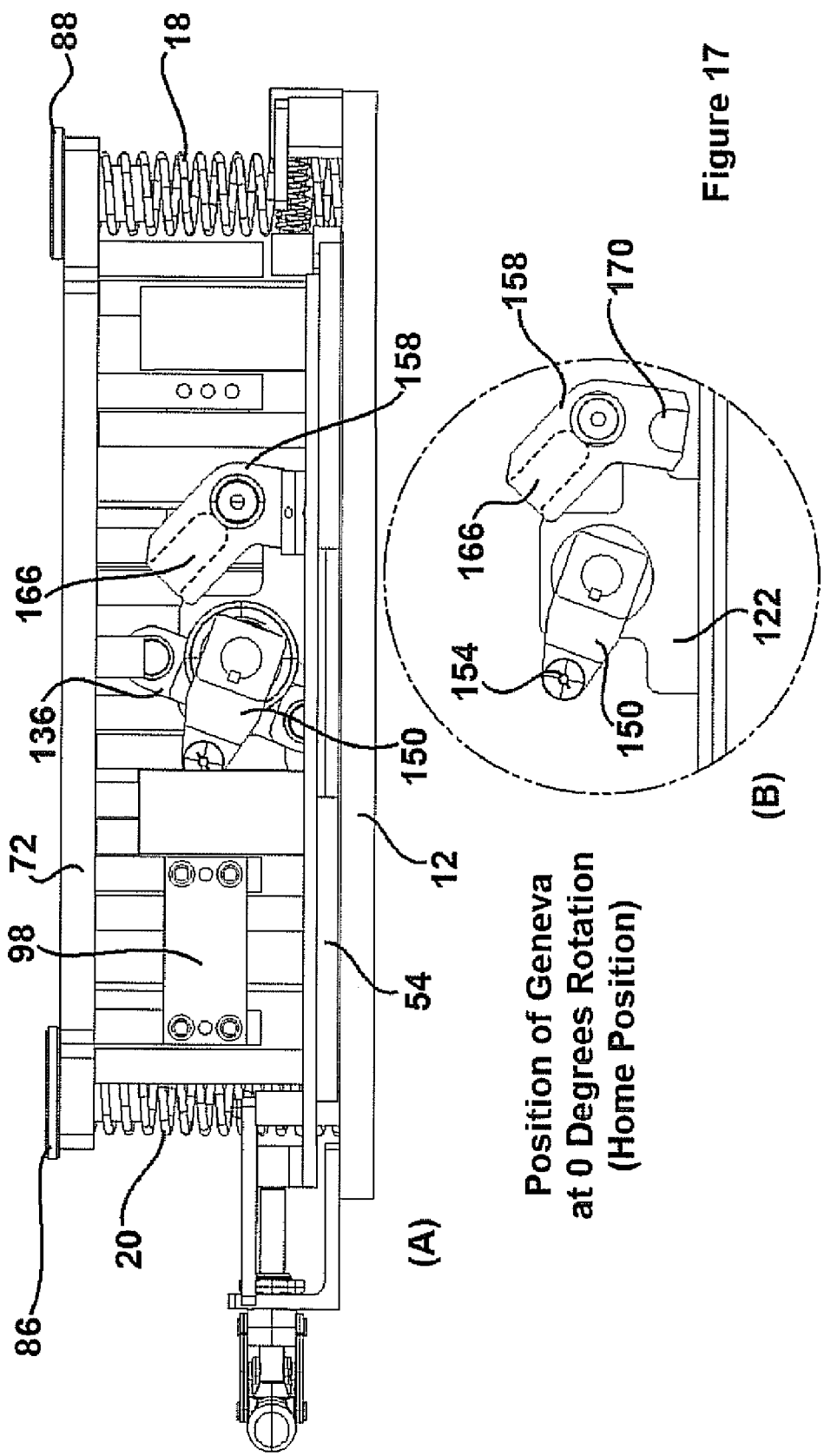
FIG. 17A is a side plan view of the pallet lift assembly in the position shown in FIG. 16, with FIG. 17B further providing an inset view of the crank mechanism at this position.
Figure 18:
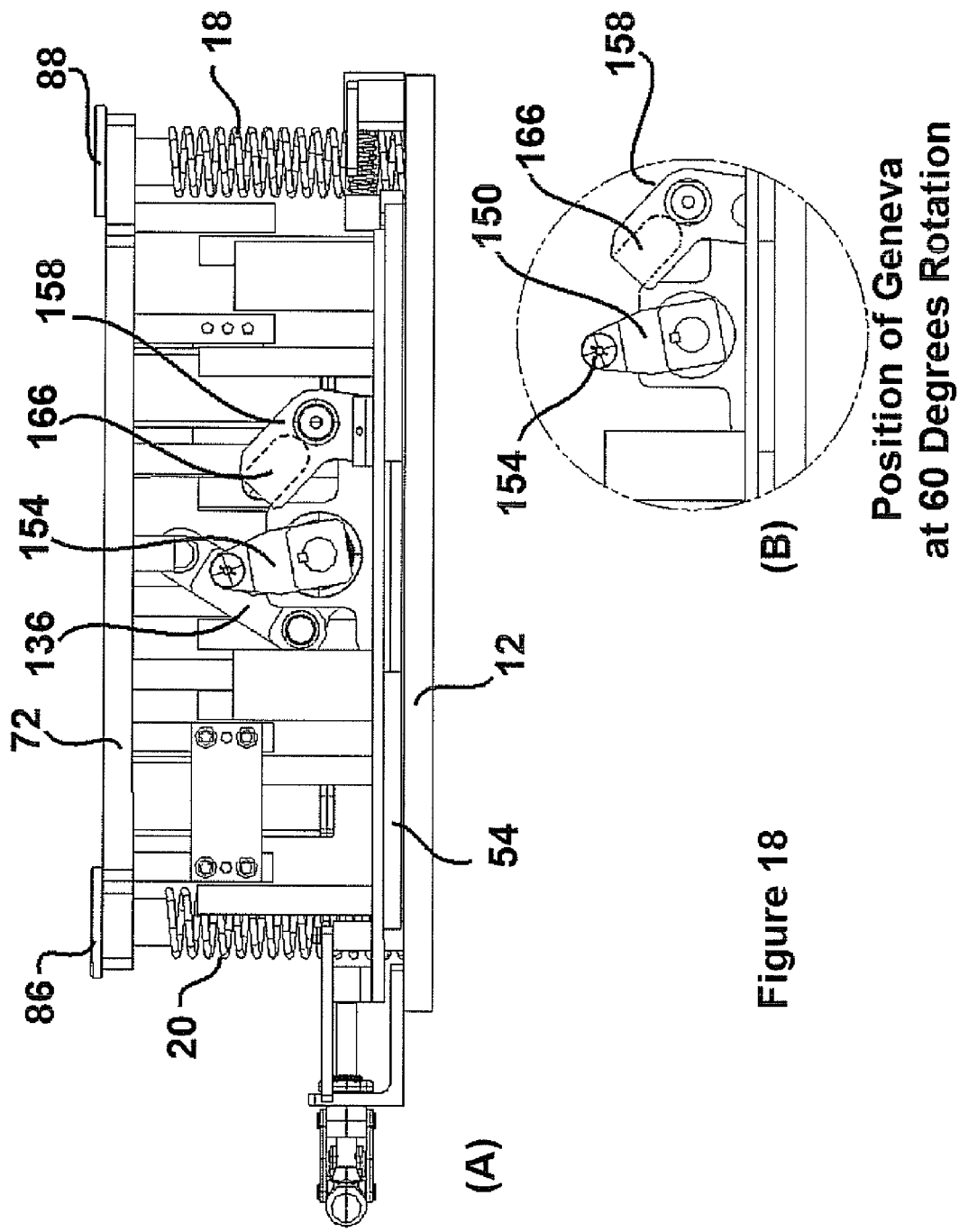
FIG. 18A is a succeeding side plan view of the pallet lift assembly and in which the crank mechanism, see also
FIG. 18B, is rotated to an intermediate 60° position concurrent with a generally midpoint elevating position established by the upper frame subassembly.
Figure 19:
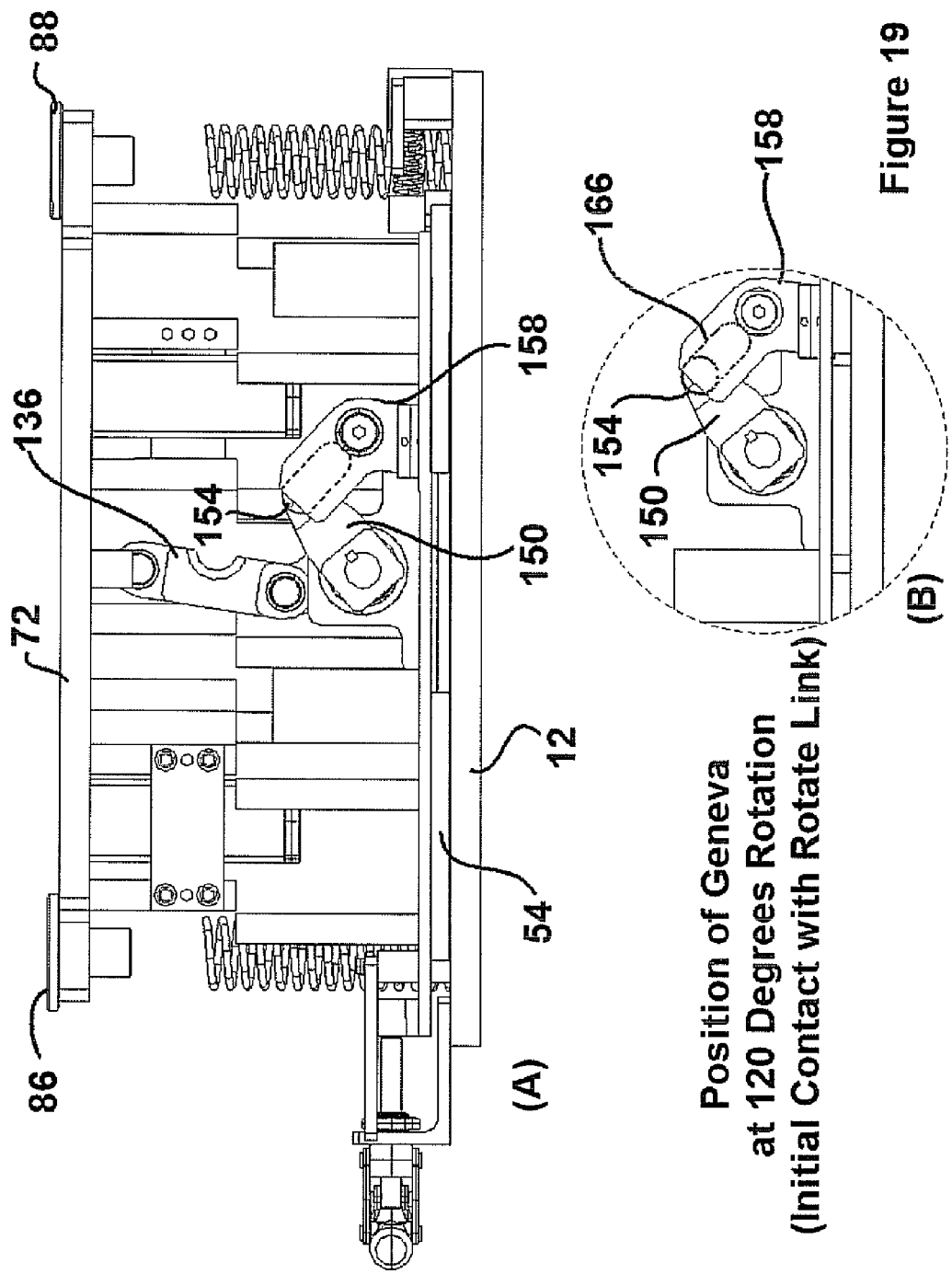
FIG. 19A is a further succeeding side plan view of the pallet lift assembly and in which the crank mechanism, see also
FIG. 19B, is rotated to a further 120° position concurrent with the upper frame assembly achieving a substantially uppermost elevated position corresponding to a first maximum height.
Figure 23:
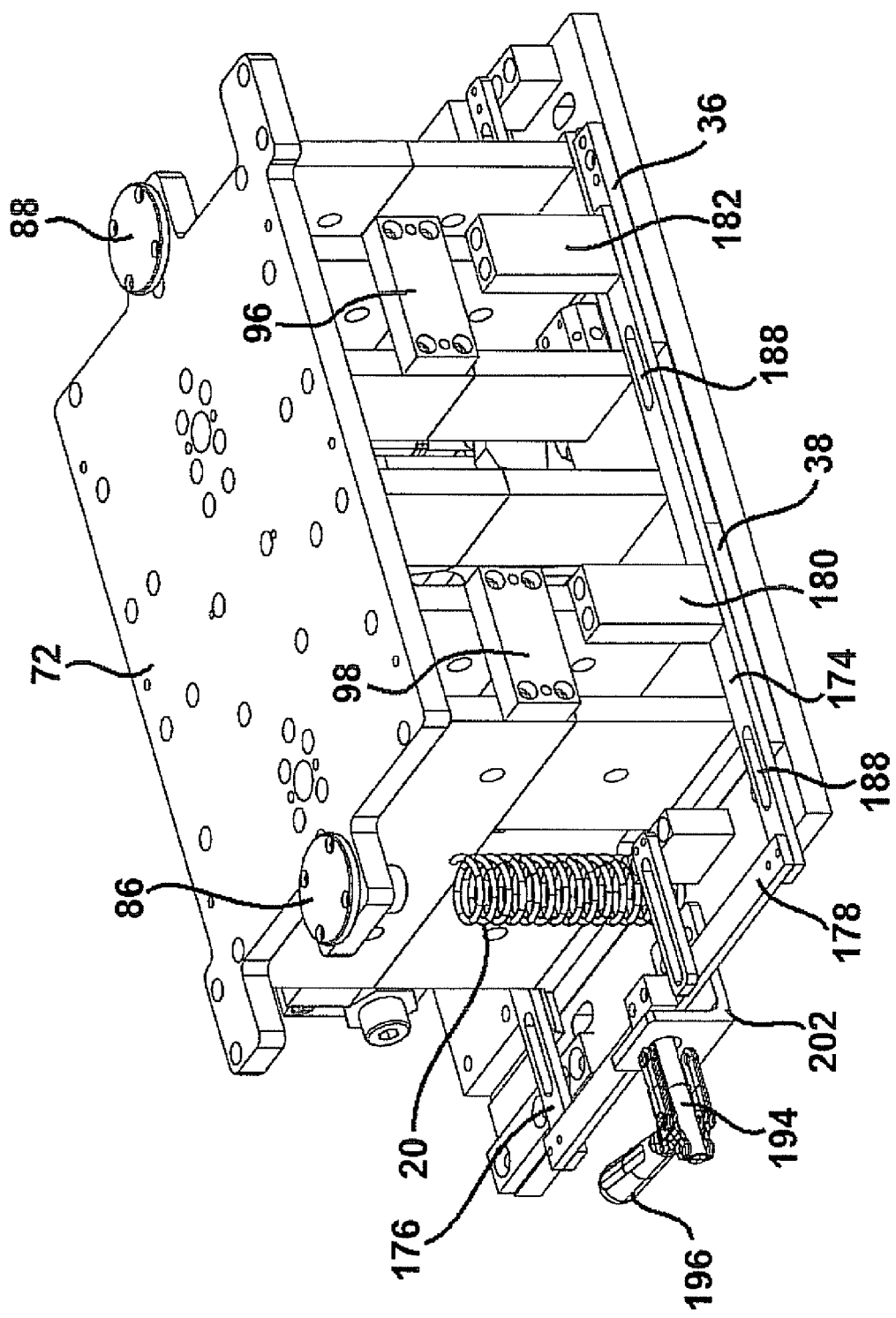
FIG. 23 is a perspective view of the assembly shown in FIG. 22.
Figure 25:
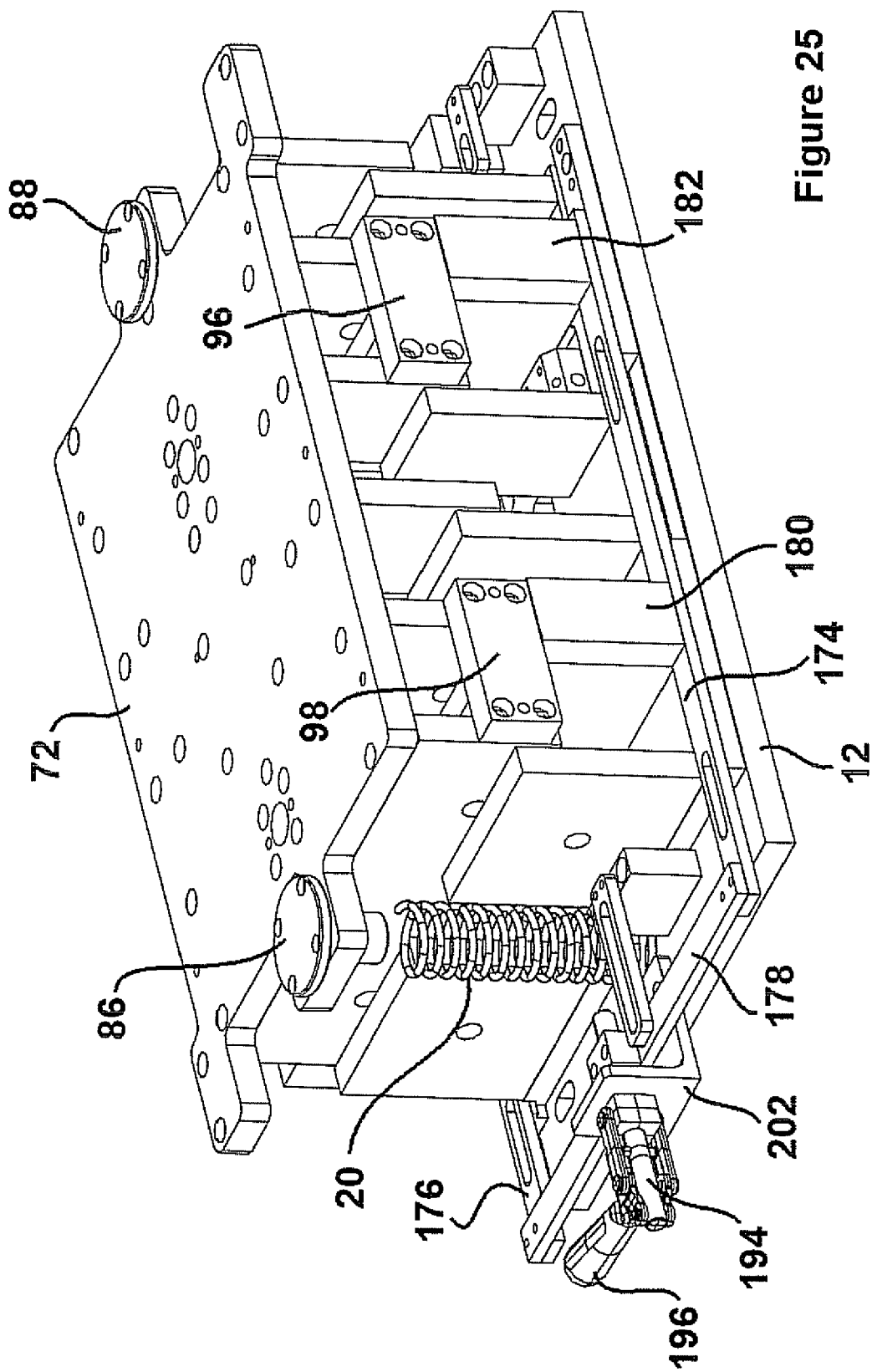
FIG. 25 is a perspective view of the intermediate height position shown in FIG. 24

Referring further to the assembled and partial cutaway view of FIG. 2, the overall exploded view of FIG. 3, the initial position perspective assembled view of FIG. 16, succeeding perspective displacement views of FIGS. 23 and 25, and the several succeeding sectional assembled and exploded views of FIGS. 4-15, the pallet lift includes a base 12 exhibiting a generally planar (typically rectangular) shape with a specified surface area and thickness. Each of the components associated with the pallet lift are typically constructed of a heavy duty grade steel or like material exhibiting the necessary properties of durability and resilience.

Figure 4:
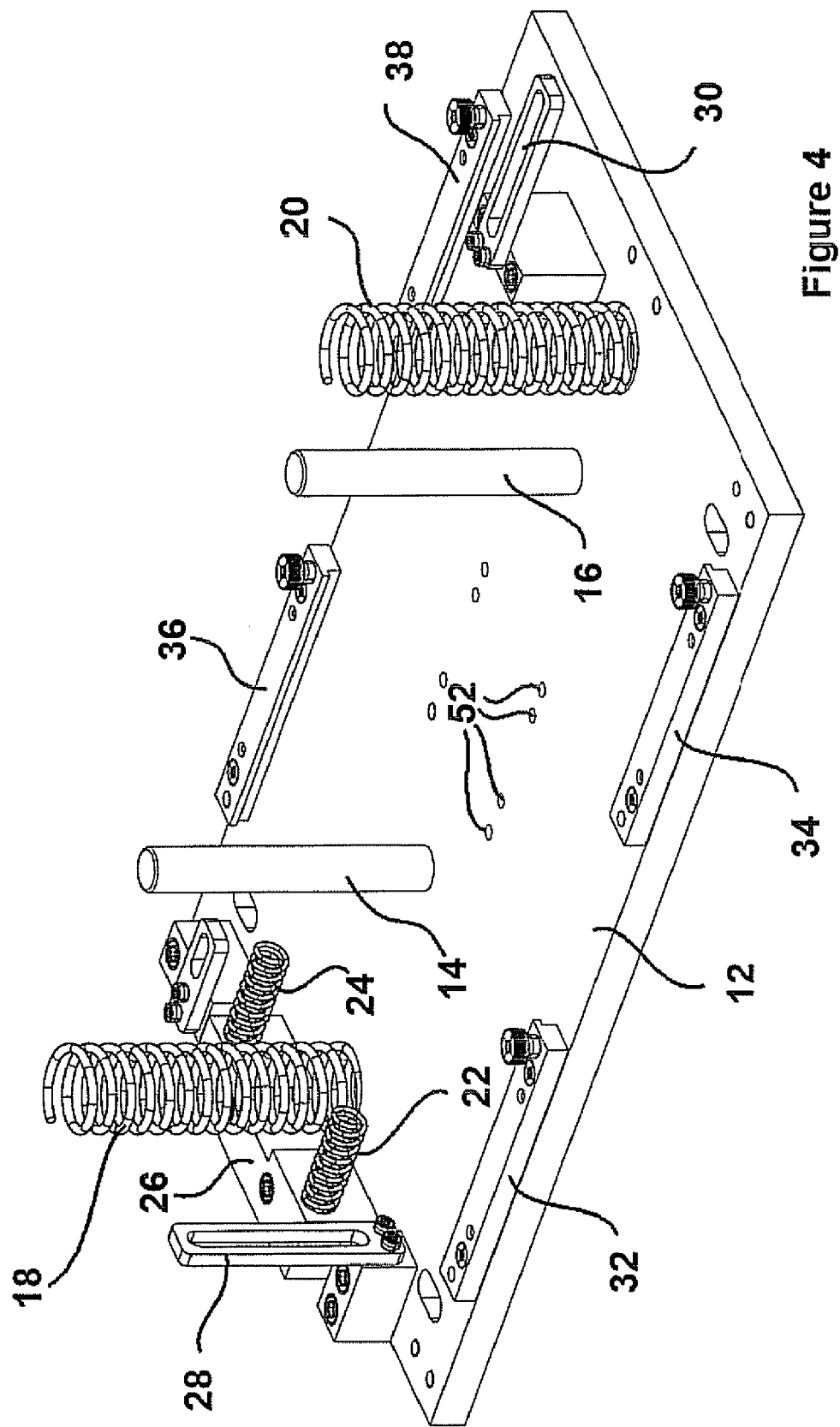
FIG. 4 is a perspective of the rectangular base subassembly.
Figure 5:
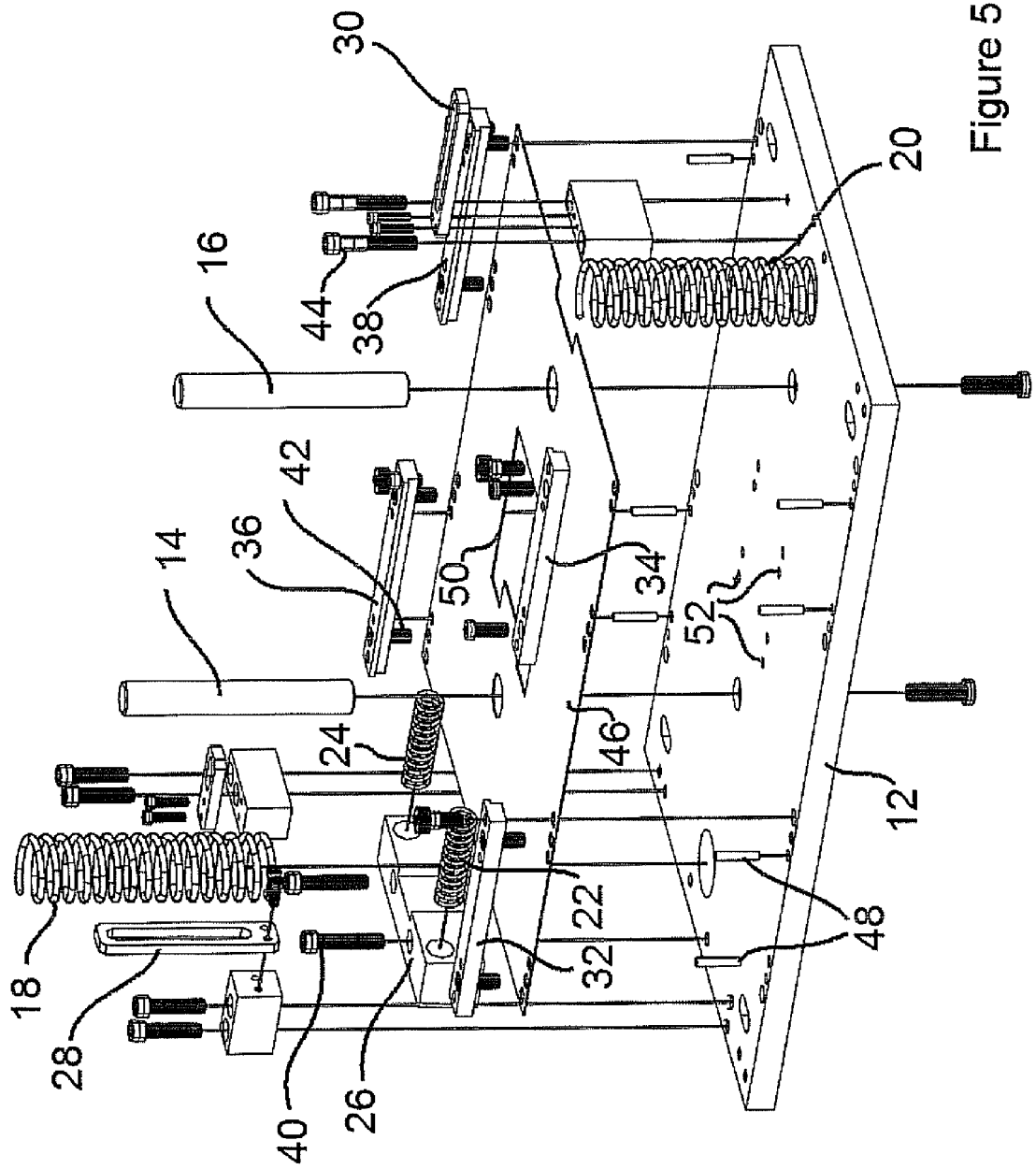
FIG. 5 is an exploded perspective of the base shown in FIG. 4 and further illustrating the arrangement of the cushioning guide springs and platform location for the Geneva type crank mechanism.

The base 12, as best illustrated in FIGS. 3-5, includes a pair of vertical guide posts 14 and 16 projecting from surface locations. A further pair of heavy duty, vertically extending and cushioning coil springs 18 and 20 are also provided in upwardly extending fashion from additional locations of the base 12. Additional features associated with the base 12 include a pair of horizontally supported and extending biasing springs 22 and 24, these being anchored by a block 26 supported at one end of the base. Additional jig support locations 28 and 30 are shown, as are pairs of lengthwise and edge extending projecting mounts, see at 32 & 34 and at 36 & 38, these being located in extending fashion along the side perimeter of the base and, as will be described, providing seating support for the limit stroke bracket utilized for establishing the intermediate elevated position of the bracket assembly.

As disclosed throughout the several views, pluralities of threaded bolt fasteners and the like are provided for securing together the various elements associated with each component subassembly. With reference to the exploded view of the base 12 shown in FIG. 5, selected fasteners according to varying size are referenced at 40 (with reference to block 26), 42 (with reference to edge extending mount 36), 44 (with reference to jig 30), et seq. For purposes of ease of description, the employment of threaded fasteners will be generally referenced in the succeeding illustrations, but not referenced in most instances.

The construction of the base 12, as best shown in FIGS. 3 and 5, can further include an upper sheet or layer 46 which exhibits a perimeter area less than the base 12. The layer 46 is secured upon the upper surface of the base 12, such as by pins 48 (FIG. 5). A central cutout portion associated with the layer 46, see inner defined perimeter 50, provides a seating location for installation f the crank mechanism as will be described. Additional locating holes, at 52 (see FIGS. 3-5) define an exposed location of the planar base surface within the upper layer perimeter 50, and at which the crank mechanism is secured.

Figure 6:
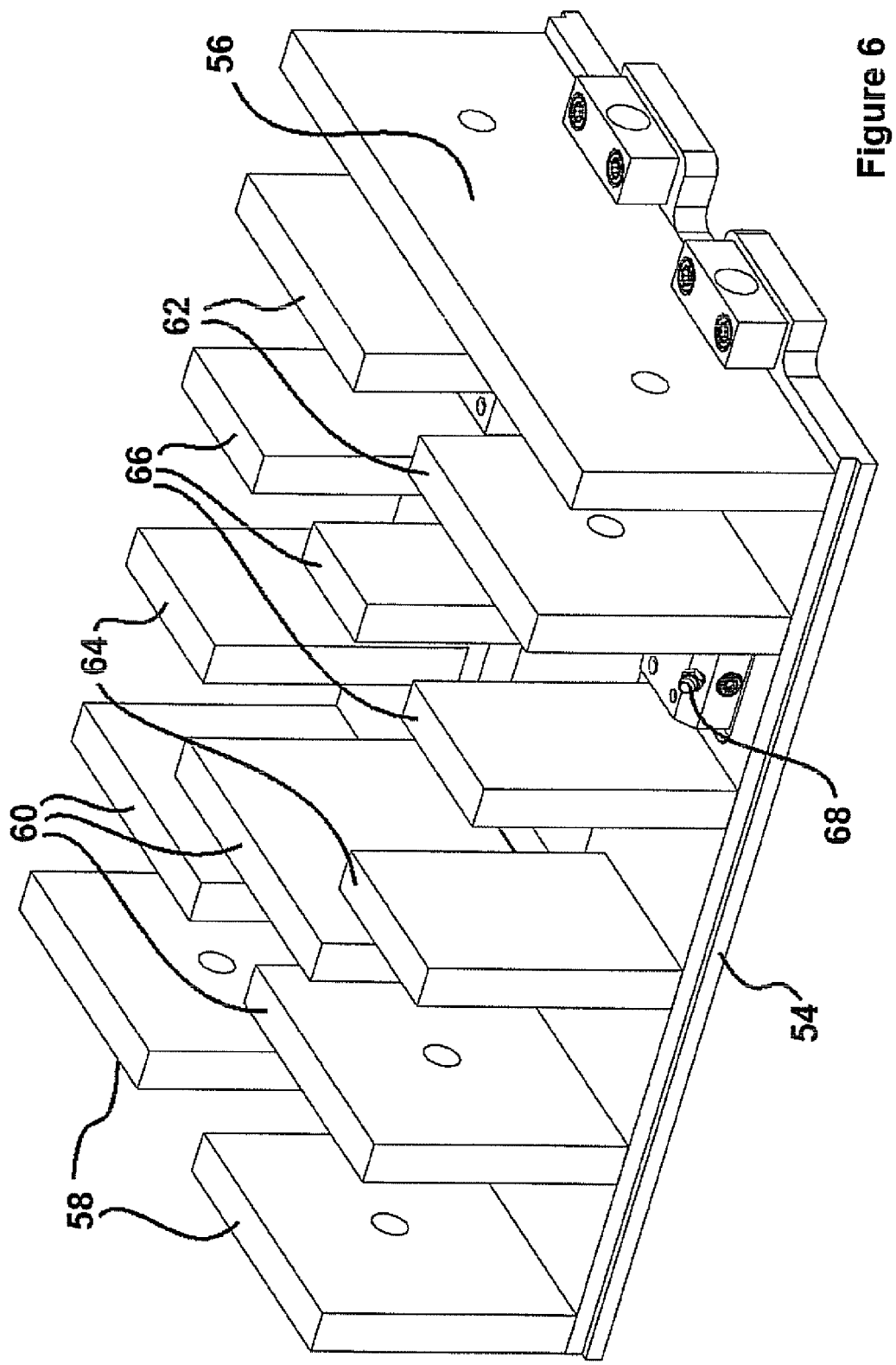
FIG. 6 is a perspective of the lower frame subassembly.
Figure 7:
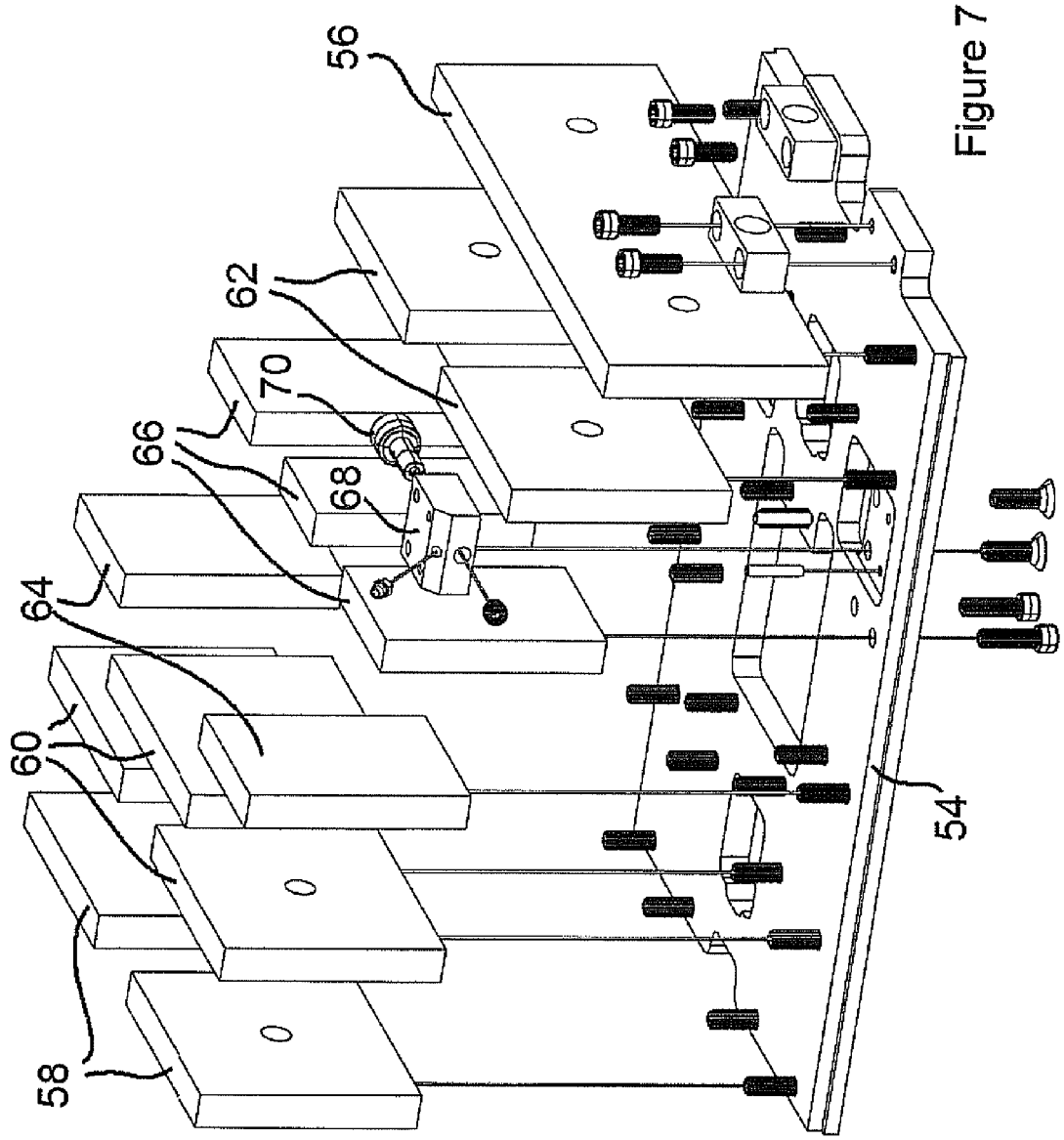
FIG. 7 is an exploded perspective of the lower frame subassembly in FIG. 6.

Referring to FIGS. 6 and 7, both perspective and exploded views are shown of a lower frame subassembly is generally shown at 54 and includes a base layer having a four sided outer perimeter generally seating within the end located projections (e.g. at 22) and jig fixtures 28 and 30, as well as locating between the outer side edge secured mounts 32-38. As will be explained in further detail, the lower frame 54 seats upon the upper surface of the base 12 and is capable of being displaced in a lengthwise fashion (such as an incremental distance in the range of 0.5"-1.0" in one non-limiting and preferred embodiment).

The lower frame 54 includes a first plurality of upwardly extending and spaced apart walls, these being arranged in generally widthwise extending fashion and exhibiting varying sizes. Reference is made to continuous end wall 56, opposite end located split walls 58, and individual intermediate pluralities of walls 60, 62, 64, and 66. Positioned along an intermediate side proximate location of the lower frame is a surface mounted support 68, from which extends inwardly a lower engaging portion, in the form of a horizontally extending pin exhibiting a rounded edge profile 70, this associated with a transfer linkage for laterally shifting the lower frame 54. Pluralities of threaded mounting fasteners are again shown for securing the walls and other components to the surface of the lower frame 54 in upwardly projecting fashion.

Figure 8:
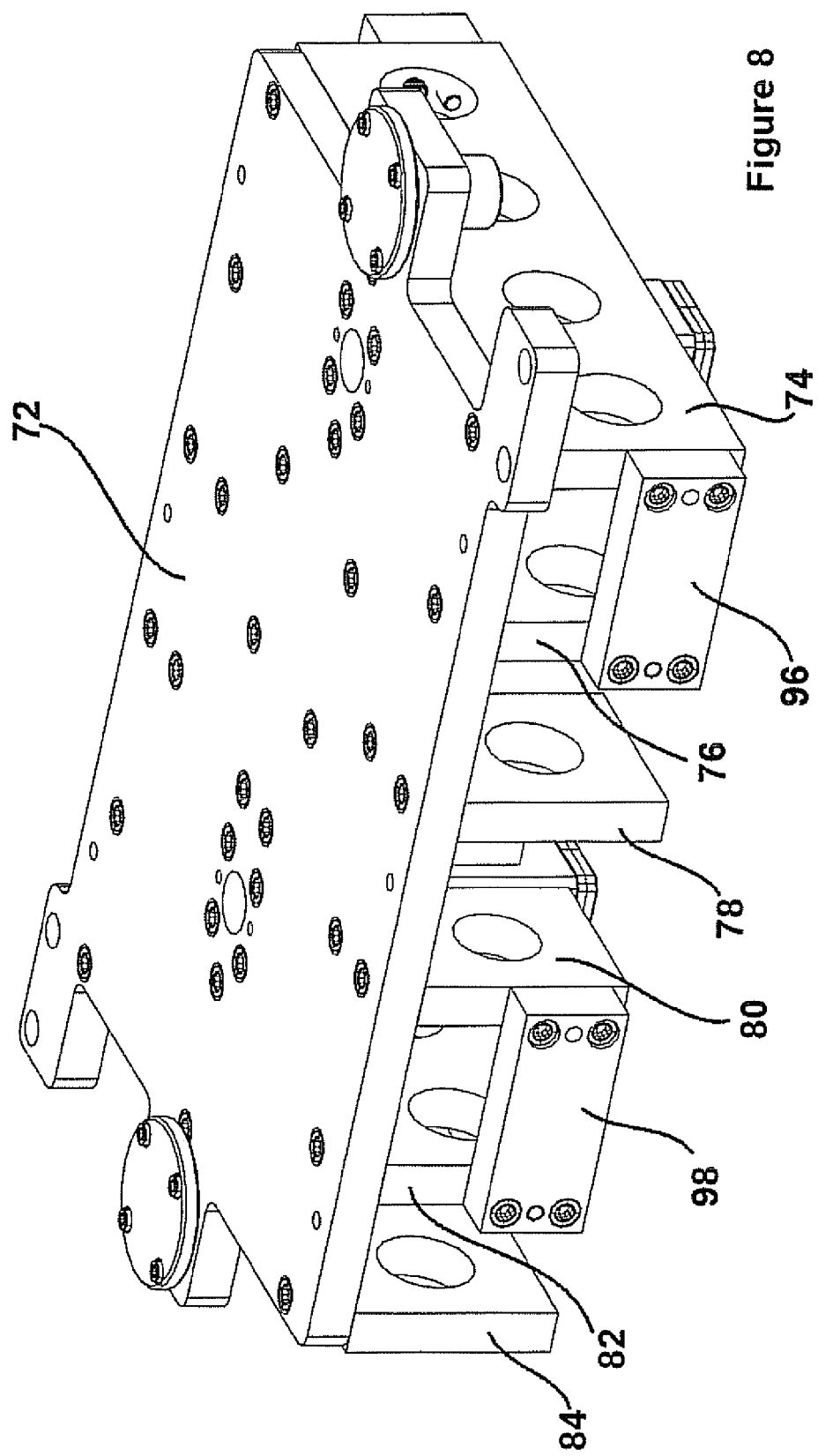
FIG. 8 is a perspective of the upper frame subassembly.
Figure 9:
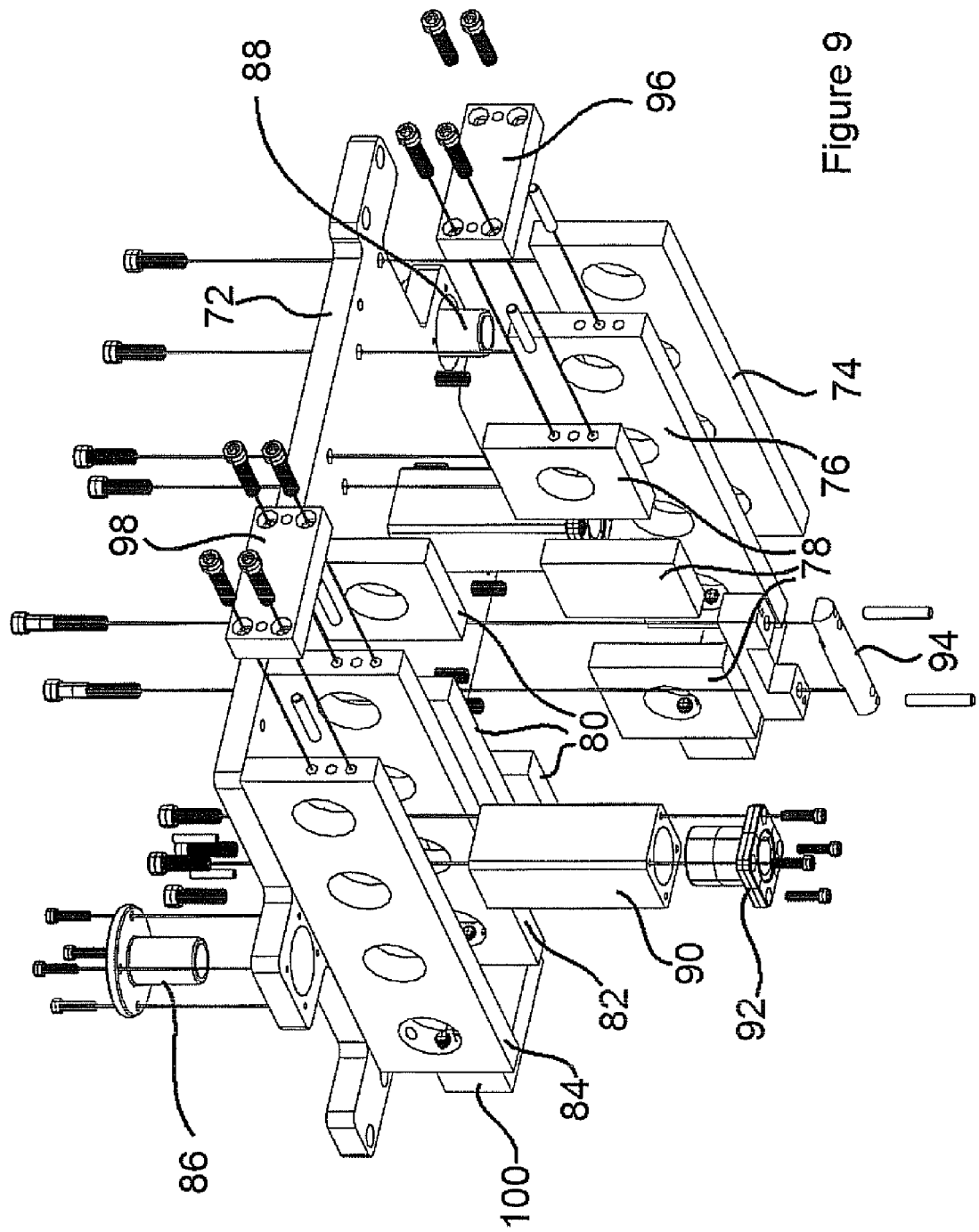
FIG. 9 is an exploded perspective of the upper frame subassembly shown in FIG. 8.

Referring now to FIGS. 8 and 9, corresponding perspective and exploded views are shown of an upper frame subassembly, see as generally referenced by base surface 72, and which also includes a four sided perimeter generally corresponding to that of the lower frame 54. The upper frame includes a second plurality of downwardly extending walls, these extending in parallel and widthwise fashion relative to the first plurality of upwardly extending walls 56-66 associated with the lower frame 54, and including additional walls 74, 76, 78, 80, 82 and 84.

As shown throughout the several illustrations, including the partial cutaway of FIG. 2 and FIG. 16 et seq., the downwardly extending walls 74-84 are arranged such that they offset and nest with the first plurality of upwardly walls 56-66 associated with the lower frame 54, this shown in FIG. 16 and corresponding to an initial (lowermost) position established between the upper and lower frames. Additional features of the upper frame include generally cylindrical shaped sleeves 86 and 88, these as shown being secured to the upper frame in downwardly extending fashion at general end locations of the upper frame, and which biasingly seats against the upper projecting ends of the cushioning coil springs 18 and 20 to support thereupon the upper frame.

Also included are underside projecting tubular supports, see at 90 in underside exploded view of FIG. 9, these being interiorly hollow and seating such as an end connection 92 for in turn slidingly receiving the vertical guide posts 14 and 16 so that, in combination with the coil springs 18 and 20, smooth and controlled vertical displacement of the upper frame is achieved. Also located at 94 in underside projecting fashion at a generally interior midpoint of the upper frame underside is an wrist pin and support this, as will be described, engaging an extending end of a first linkage associated with the crank and facilitating vertical controlled and guided displacement of the upper frame 72. Also shown at 96 and 98 are pairs of horizontal extending crosswise supports, these being secured to exterior side edges of selected downwardly extending walls (see as shown by support 96 secured to exterior sides of walls 74 and 76 and support 98 likewise secured between walls 80 and 82).

The views of FIGS. 3, 8 and 9 do not adequately show the rear side of the upper frame 72, however it is understood that an identical pair of horizontal supports (see as referenced by partially illustrated support 100) is also provided and, collectively, the crosswise supports are located outboard of the first plurality of upwardly extending walls 60-66 such that vertical displacement of the upper frame 72 can occur without any interference between the cross wise supports 96, 98, 100 and the walls 60-66. The upper workpiece supporting platen, or anvil, surface 6 is not shown in FIGS. 8 and 9, however it is understood that such can be engaged in the manner shown in FIG. 1.

Figure 10:
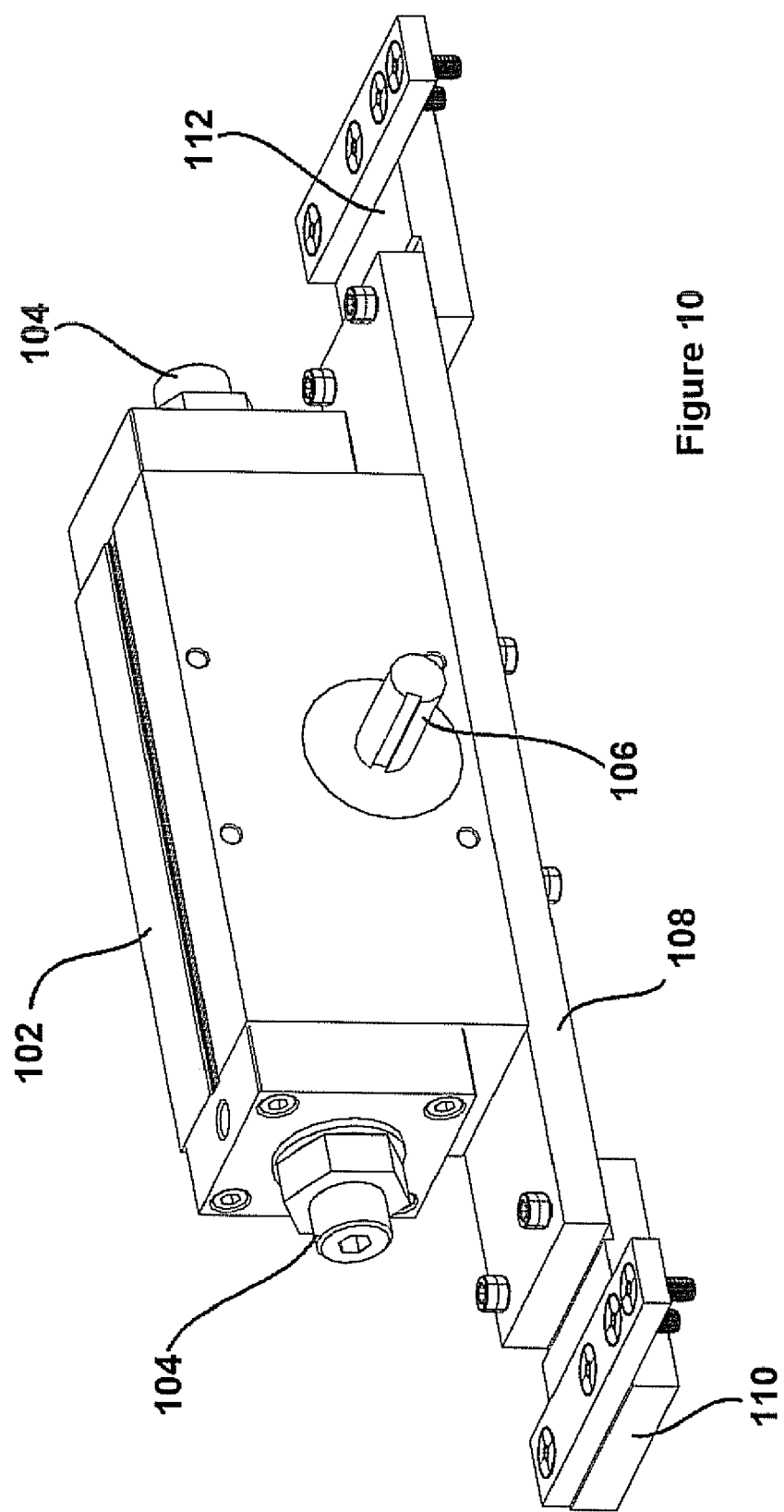
FIG. 10 is a perspective of the rotary drive cylinder subassembly.
Figure 11:
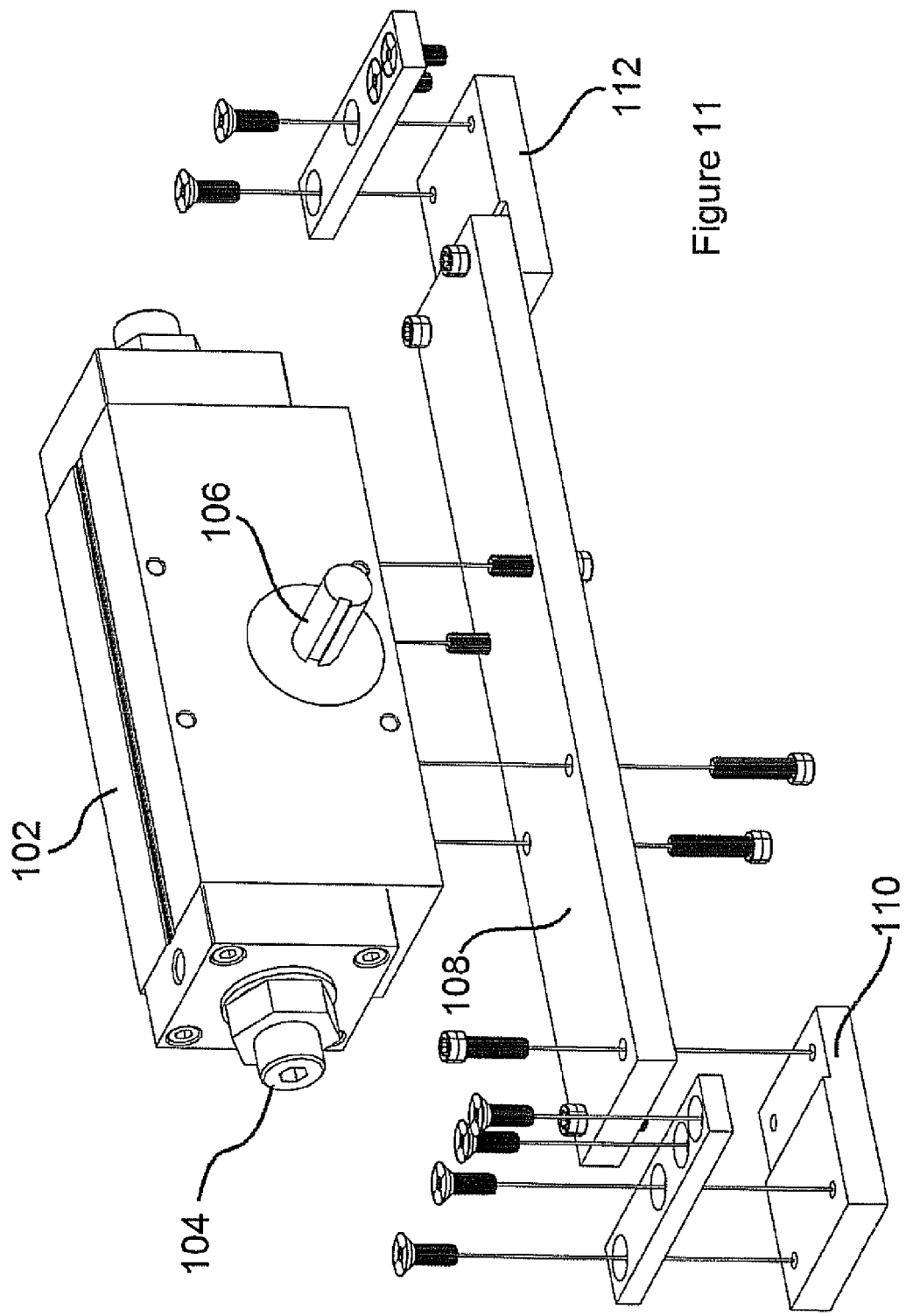
FIG. 11 is an exploded perspective of the rotary drive cylinder subassembly shown in FIG. 10.

Referring now to FIGS. 10 and 11, a fluid cylinder is shown at 102 and most generally includes a fluid connections 104 (such as located at opposite ends of the cylinder and to which such as a pneumatic or hydraulic hose can be connected), as well as a rotary output shaft 106. The cylinder 102 is secured upon a suitable support 108, such as including end-mounting locations 110 and 112 and which, in the illustrated embodiment, enables the drive cylinder 102 to be located in side proximate extending fashion outside the base 12. Although not shown, it is understood that other rotary drive inducing structure, such as cam driven mechanical or other type mechanisms not limited to a fluid driven cylinder, can also be employed within the overall scope of the invention.

Figure 12:
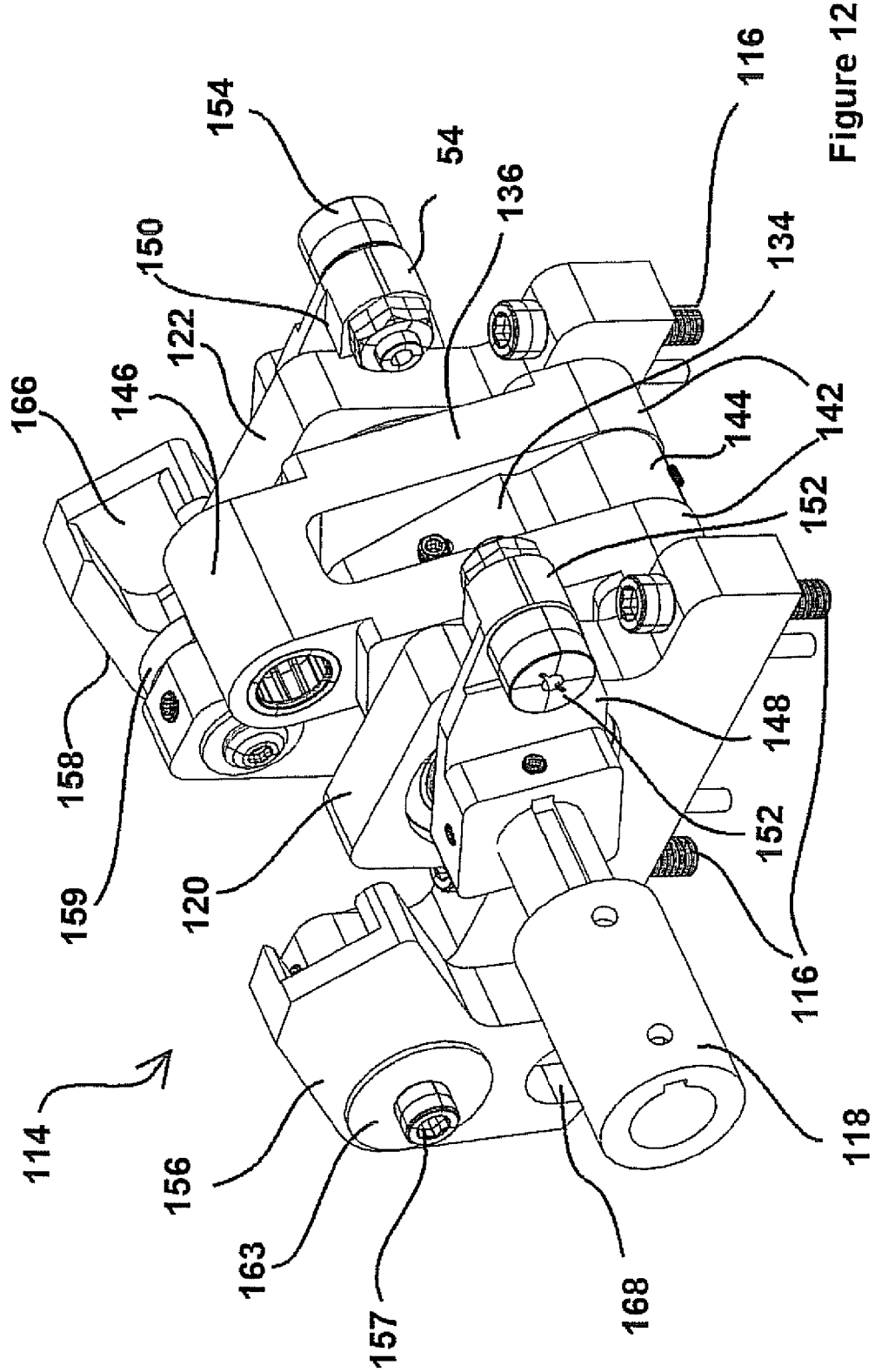
FIG. 12 is a perspective of the Geneva style crank subassembly.
Figure 13:
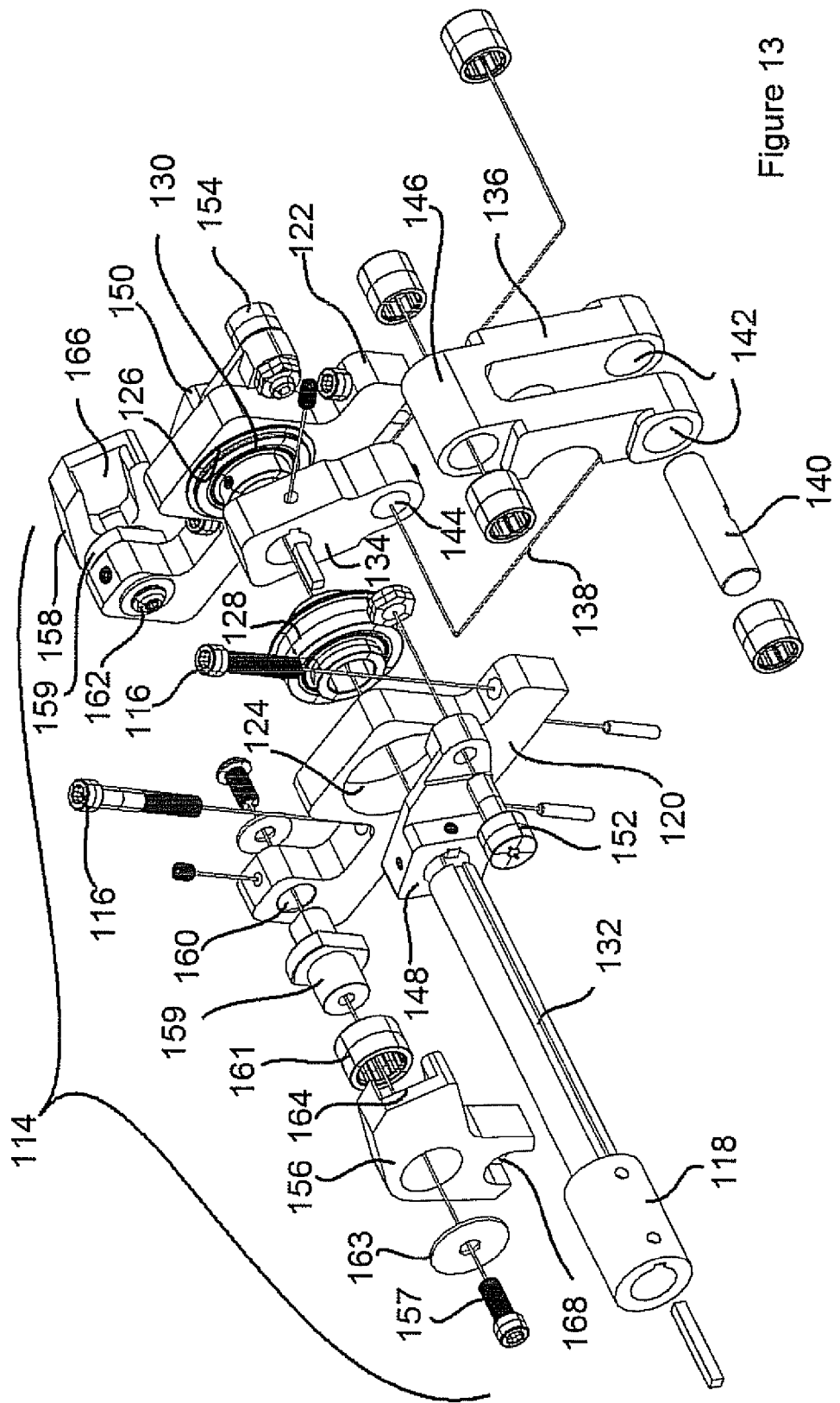
FIG. 13 an exploded perspective of the crank subassembly shown in FIG. 12.

Proceeding to FIGS. 12 and 13, perspective assembled and exploded views are shown of the crank mechanism, generally at 114, which is secured at the mounting locations 52 associated with the planar base 12 in a generally interior and centralized location (see underside projecting mounting bolts 116). As shown, the configuration and location of the crank mechanism 114 is such that it does not interfere with the placement of the pluralities of overlapping ad nesting walls associated with the upper and lower frames.

The crank mechanism 114 is constructed so that it translates a rotary drive input into an intermittent rotary motion, such as generally according to the principles of a Geneva type drive. A rotary driven component 118 exhibits a generally cylinder shape and is interiorly hollowed for receiving, in keyed fashion, the rotary output shaft 106 associated with the cylinder 102. Fixed and spaced apart frame members 120 and 122 support the underside projecting bolts 116 and further exhibits central apertures 124 and 126 (see as best shown in FIG. 13) which in turn seat durable bearing components 128 and 130. The rotary driven component 118 includes an elongated shaft 132 (see again FIG. 13) which extends the substantial width of the crank mechanism and which provides rotary driven support to the respective drive linkages as will be described.

A first linkage includes a lower rotary driven arm 134 (this keyed to the internal extending drive shaft 132), as well as an upper pivotally engaged arm 136. The arm 136, as best shown in FIG. 13, is a dual arm linkage which is pivotally secured at a lower end to an end of the lower driven arm 134 (see directional line 138 in FIG. 13 which references a pin 140 seating through aligning hinge locations 142 associated with the dual arm linkage 136 and inter-disposed location 144 associated with the extending end of the rotary driven lower arm 134. The opposite end of the dual arm linkage 134, see at 146, engages the underside located hinge projection 94 associated with the upper frame 72. As will be described in additional detail with reference to the operational views of FIGS. 17-20, the first linkage operates to elevate the upper frame 72 between an initial lowermost position and an uppermost elevated position.

The crank further including a second linkage having a rotary driven and elongate member, see pair of spaced apart outer members 148 and 150 which are pivotally mounted outboard the stationary frame members 120 and 122 and the centrally disposed first linkage. Each of the outer rotary members 148 and 150 exhibits a generally arcuate end surface, see as configured by circular end pins 152 and 154, and which are coaxially mounted in both outward and angularly offset fashion relative to the rotary driven arm 134 and dual arm linkage 136 associated with the first linkage.

Interfacing with the outer rotary driven members 148 and 150 of the secondary linkage are a pair of generally boomerang shaped transfer linkages, at 156 and 158, and which are pivotally secured (via pin fasteners 157 and bearing supports 159 with intermediate bushings 161 and washers 163) at locations 160 and 162 at the rear of the fixed and spaced apart frame members above the planar base 12. The linkages 156 and 158 each include upper portions 164 and 166 (these further configured by inwardly facing and arcuate recess pockets) which receive the arcuate end pin configurations 152 and 154 of the secondary linkage arms 148 and 150 and upon the rotary driven elongate members completing their rotationally driven cycle.

The transfer linkages 156 and 158 further each include lower portions 168 and 170 (see also FIG. 3) which, upon the transfer linkages being pivoted by contact from the end pins 152 and 154, engage the horizontally extending pins exhibiting the rounded edge profiles 70 associated with the lower frame 54. In this manner, the second linkage rotary arms 148 and 150 successively displace the lower frame 54 (such as nominal distance according to one non-limiting variant in a range of 0.50" to 1.0") and so that the first plurality of walls 56-66 of the lower frame 54 align with the second plurality of walls 74-84.

FIGS. 14 and 15 illustrate perspective and exploded views of the limit stroke bracket subassembly, generally shown at 172 and which includes a generally "U" shaped limit stroke bracket displaceably supported upon the planar base 12. The bracket includes spaced apart sides 174 and 176 which are interconnected by a central elongate portion 178. First and second pairs 180 & 182 and 184 & 186 of column supports are supported in upwardly extending fashion upon the sides 174 and 176. Pairs of lengthwise extending slots 188 and 190 are formed in the bracket sides 174 and 176, in offsetting fashion relative to the pairs of column supports 180-186, the slots aligning with and securing to, via pins 192 (see FIG. 2), the pairs of lengthwise and edge extending projecting mounts, see again at 32 & 34 and at 36 & 38, again located in extending fashion along the side perimeter of the base 12.

In this fashion, the limits stroke bracket subassembly 172 is installed upon the base 12 with the pairs of column supports 180 & 182 and 184 & 186 located outward from the sides and associated plurality of upwardly extending walls associated with the lower frame 54. As will be further described, the upper ledge supporting surfaces of the column supports are in co-linear alignment with the lower supporting surfaces of the horizontal extending crosswise supports 96, 98, 100 associated with the upper frame 72 and such that, upon linearly displacing the limit stroke bracket following the upper frame being displaced to the elevated position by the crank mechanism 114, the column supports 180, 182, 184 and 186 align underneath the crosswise supports 96, 98, 100, following which return actuating of the crank causes the horizontally extending crosswise supports to seat upon the column supports to reposition the upper frame at an intermediate elevated position (referring to FIG. 25).

The limit stroke bracket 172 further includes a rod 194 which is linearly displaceable by a pivotal handle 196 via an interposed cam-linkage 198 which selectively retracts or extends the rod 194 upon pivoting of the handle 196 about an axis shown at 200 (FIG. 15). As further shown, the stationary cam pivoting handle mechanism is affixed, at a threaded mounting location 201 to an end of the base 12 via a bracket 202 with engaging nut 203 (see in particular FIG. 15). The displaceable rod 194 secures at a forward end to a pedestal mounting support 204 at a midpoint of the central elongate portion 178, see also threaded fastener 206 which passes through a central aperture in the support 204 and seats within a hollow threaded interior associated with an extending end of the rod 194 (again FIG. 15).

Having substantially described the structure associated with the pallet lift, a brief description will now be made of the operation of the pallet lift between its initial, maximum elevated and intermediate positions. FIG. 16 is a perspective assembled view of the pallet lift assembly in an initial position in which the first and second pluralities of walls 56-66 and 74-84 are nested in their offset position and the upper platen surface of the upper frame 72 is in its lowermost position. FIG. 17A is a side plan view of the pallet lift assembly in the position shown in FIG. 16 (with portions removed such as the horizontal support 96 for ease of illustration), with FIG. 17B further providing an inset view only of the positioning of the second linkage driven arms (see arm 150) of the crank mechanism at the initial position relative to the correspondingly positioned boomerang transfer linkage 158.

FIG. 18A is a succeeding side plan view of the pallet lift assembly and in which the crank mechanism 114, see also inset FIG. 18B, is rotated to an intermediate 60° position concurrent with a generally raid-point elevating position established by the upper frame subassembly 72. At this location, the first linkage assembly (including lower rotary driven arm 134 and upper linkage arm 136) is progressively elevating the upper frame 72, whereas the angularly offset and second linkage rotary driven arms (shown in side profile by selected arm 150 with rounded end pin profile 154) rotates in a direction towards the receiving pocket 166 defined in the boomerang pivoting linkage 158.

FIG. 19A is a further succeeding side plan view of the pallet lift assembly and in which the crank mechanism, see also FIG. 19B, is rotated to a further 120° position concurrent with the upper frame assembly 72 achieving a substantially uppermost elevated position corresponding to a first maximum height, and by virtue of the continued actuation of the first linkage (arms 134 and 136). At this point, the offset rotary driven arm (again at 150) is rotated to an initial contacting, and as yet non-actuating, position relative to the upper portion arcuate receiving pocket 166 associated with the boomerang transfer linkage.

Figure 20:
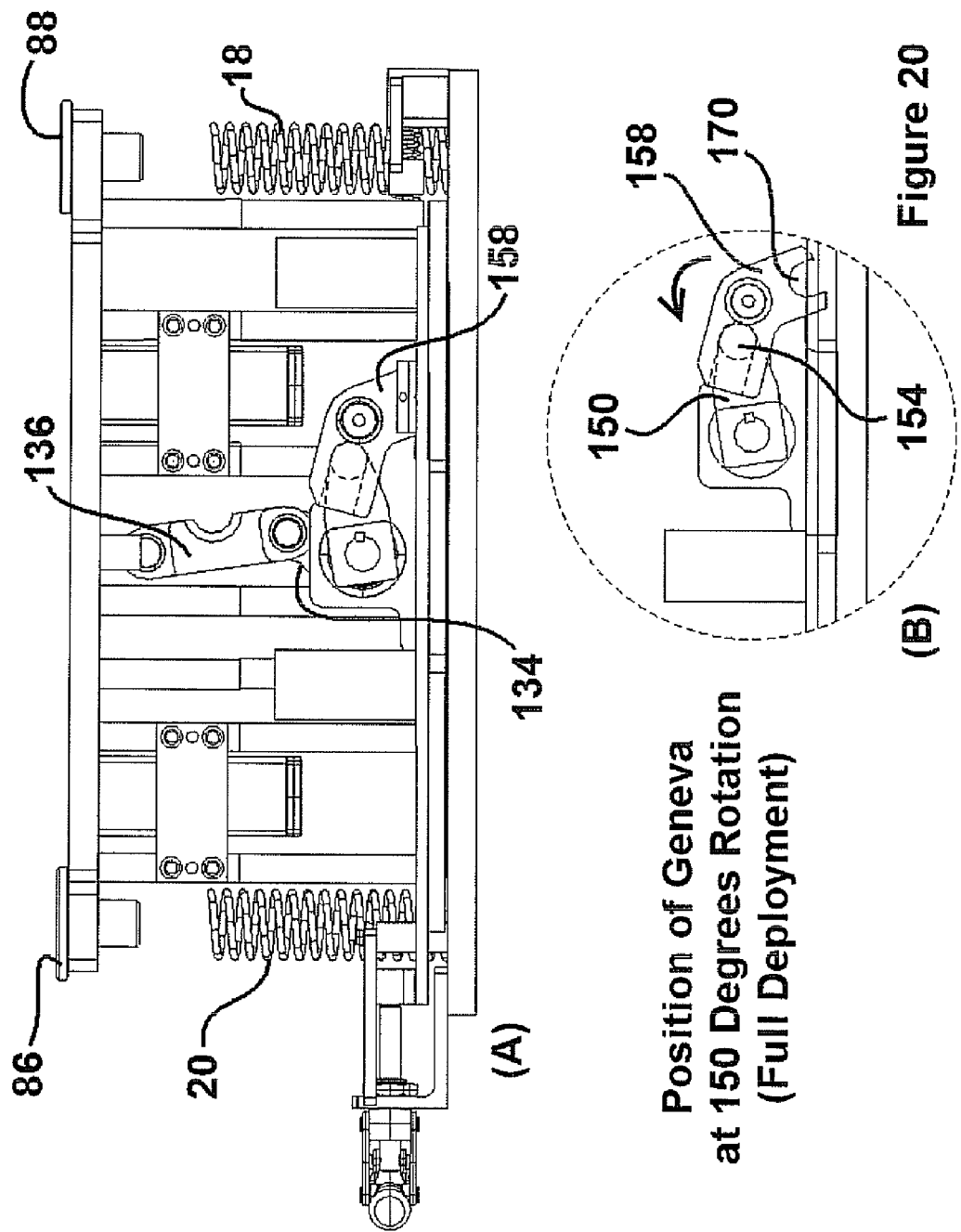
FIG. 20A is a final succeeding side plan view of the pallet lift assembly and in which the crank mechanism, see also FIG. 20B, during its succeeding rotation between the 120° to final 150° positions, engages a boomerang shaped pivot arm which causes lateral displacement of the lower frame subassembly against the biasing force of the lateral coil springs supported against the base, with consequent alignment of the vertical supports of the upper and lower frame subassemblies for maintaining the upper frame subassembly in its first uppermost height position.

Proceeding to FIG. 20, a final succeeding side plan view is shown of the pallet lift assembly, and in which the second offset linkage arm 150 with end pin 154 of the crank mechanism, see also inset FIG. 20B, during its succeeding rotation between the 120° to final 150° positions, engages and rotates the boomerang shaped pivot arm 158 (see also FIG. 20B). This in turn causes lateral displacement of the lower frame subassembly 54 against the biasing force of the lateral coil springs 22 and 24 supported against the base 12 (again FIG. 3), with consequent alignment of the vertical support walls 56-66 and 74-84 of the lower and upper frame subassemblies for maintaining the upper frame subassembly in its first uppermost height position.

The construction of the first linkage (arms 134 and 136) is further such that, during the engagement cycle of the second linkage rotary driven arms (arm 150) during the thirty degree cycle in FIG. 20, the ongoing actuation of the first linkage causes the downwardly extending walls 74-84 of the upper frame 72 to briefly rise above the ledge supporting surfaces of the lower frame walls 56-66, this concurrent with the lateral shifting of the displace-ably supported lower frame 54 resulting from rotation to translation force exerted the second rotary arm pin 154 against and within the upper portion defined pocket 166 of the boomerang transfer linkage 158, with the lower outer recessed pocket 170 driving the horizontally supported pin 70 secured to the lower frame surface 54. Upon reverse actuating of the crank 114, the rotary arms associated with the second linkage unseat from the receiving pockets associated with the boomerang mechanism, this resulting in the lateral spring forces 22 and 24 returning the lower frame to its initial position in the opposing pluralities of walls are again spatially offset, this further enabling the intermediate elevated position assisted by the limit stroke bracket.

Figure 21:
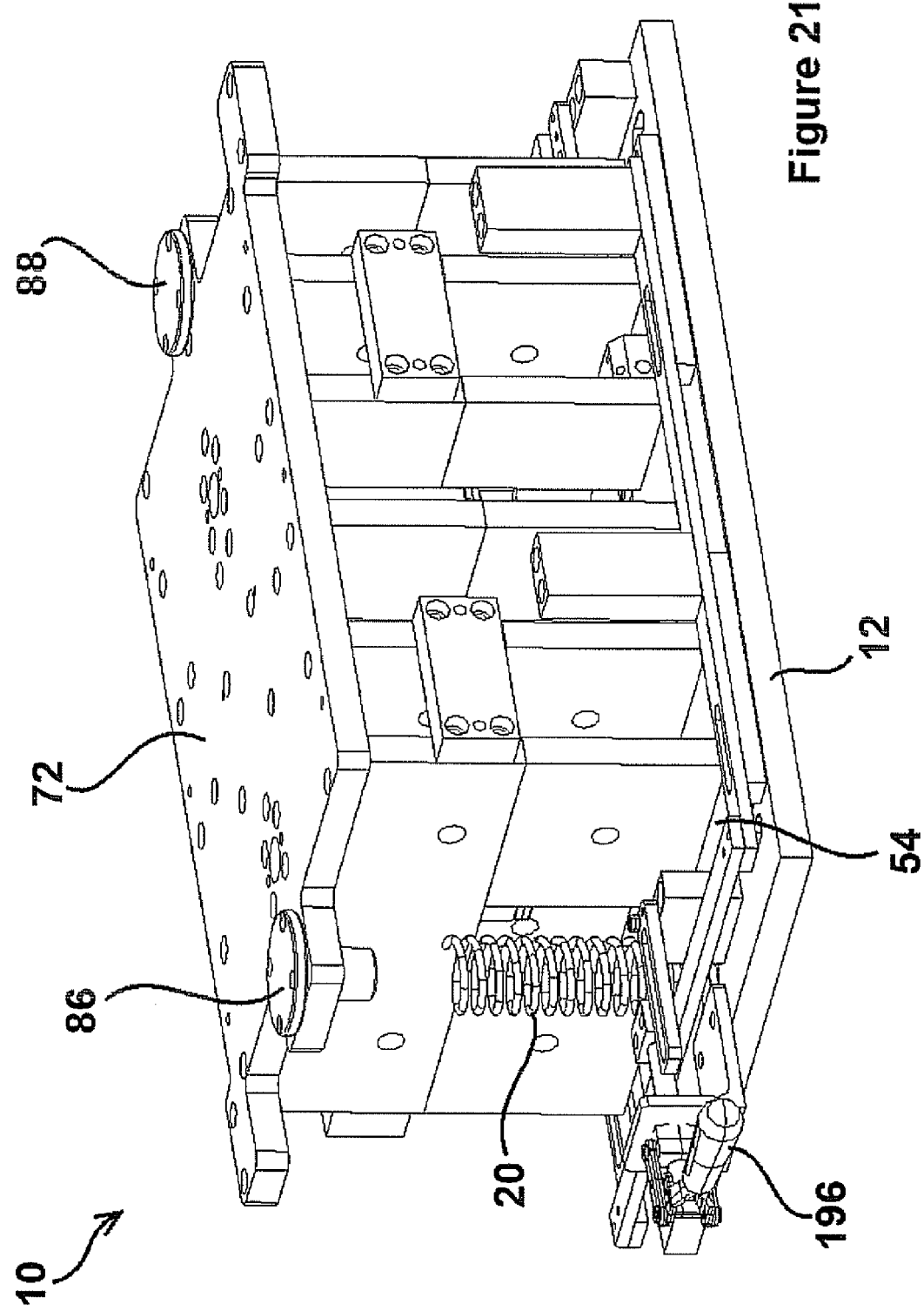
FIG. 21 is a perspective illustration of the upper frame assembly in its maximum height position shown in FIG. 20.
Figure 22:
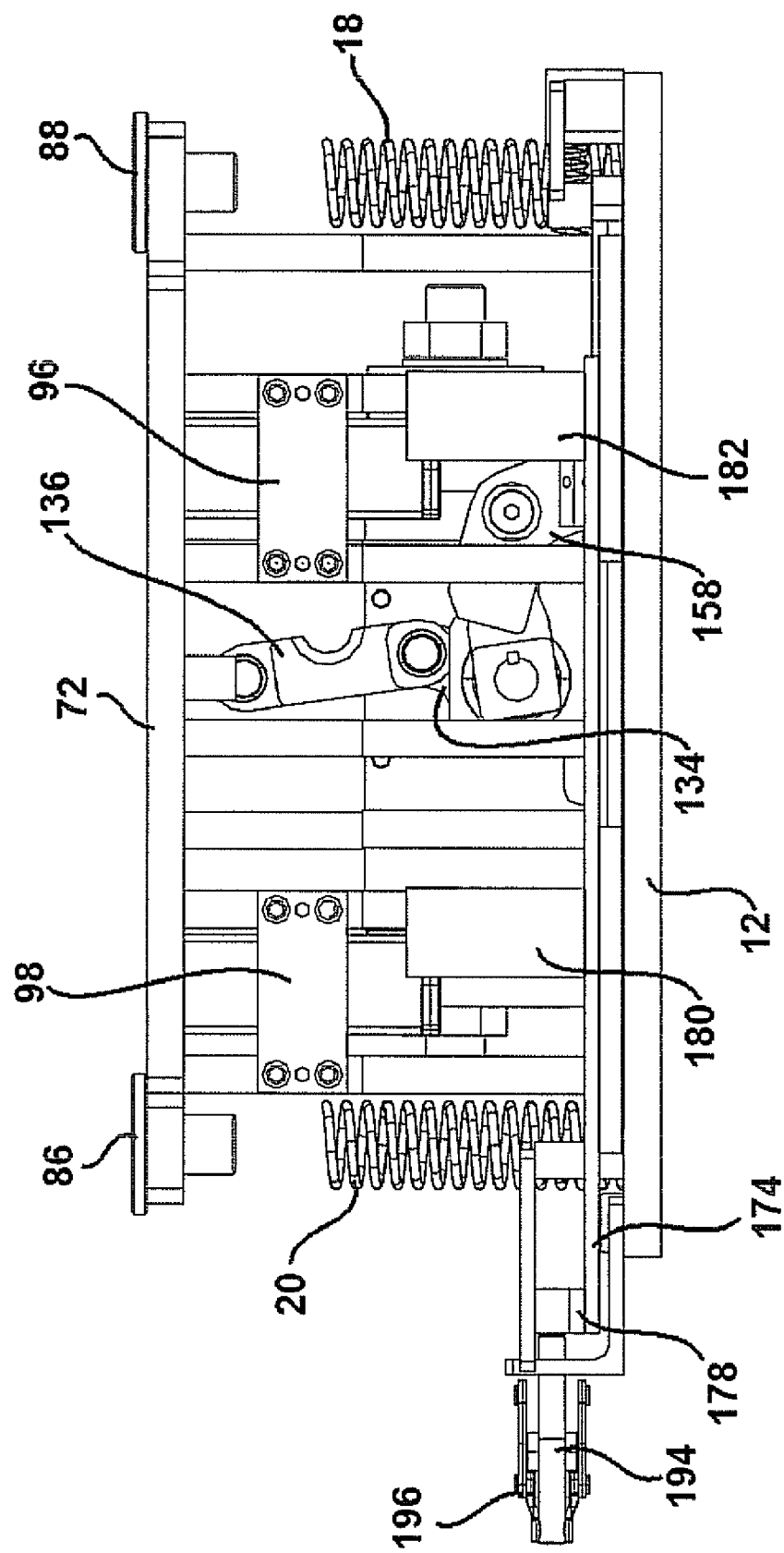
FIG. 22 is a side view illustration succeeding the position shown in FIGS. 20 and 21, and in which the limit stroke bracket with first and second pairs of column supports is linearly displaced upon actuating the pivot handle.

FIG. 21 is a perspective illustration of the upper frame 72 in its maximum height position shown in FIG. 20, relative to the lower frame 54 and supporting base 12 and again showing the pluralities of opposing and spaced apart walls associated upper and lower frames in their aligned and stacked position. FIG. 22 is a side view illustration succeeding the position shown in FIGS. 20 and 21, and in which the limit stroke bracket with first and second pairs of column supports is linearly outwardly displaced upon actuating the pivot handle 196 and resultant cam-driven retraction of the rod 194.

Figure 24:
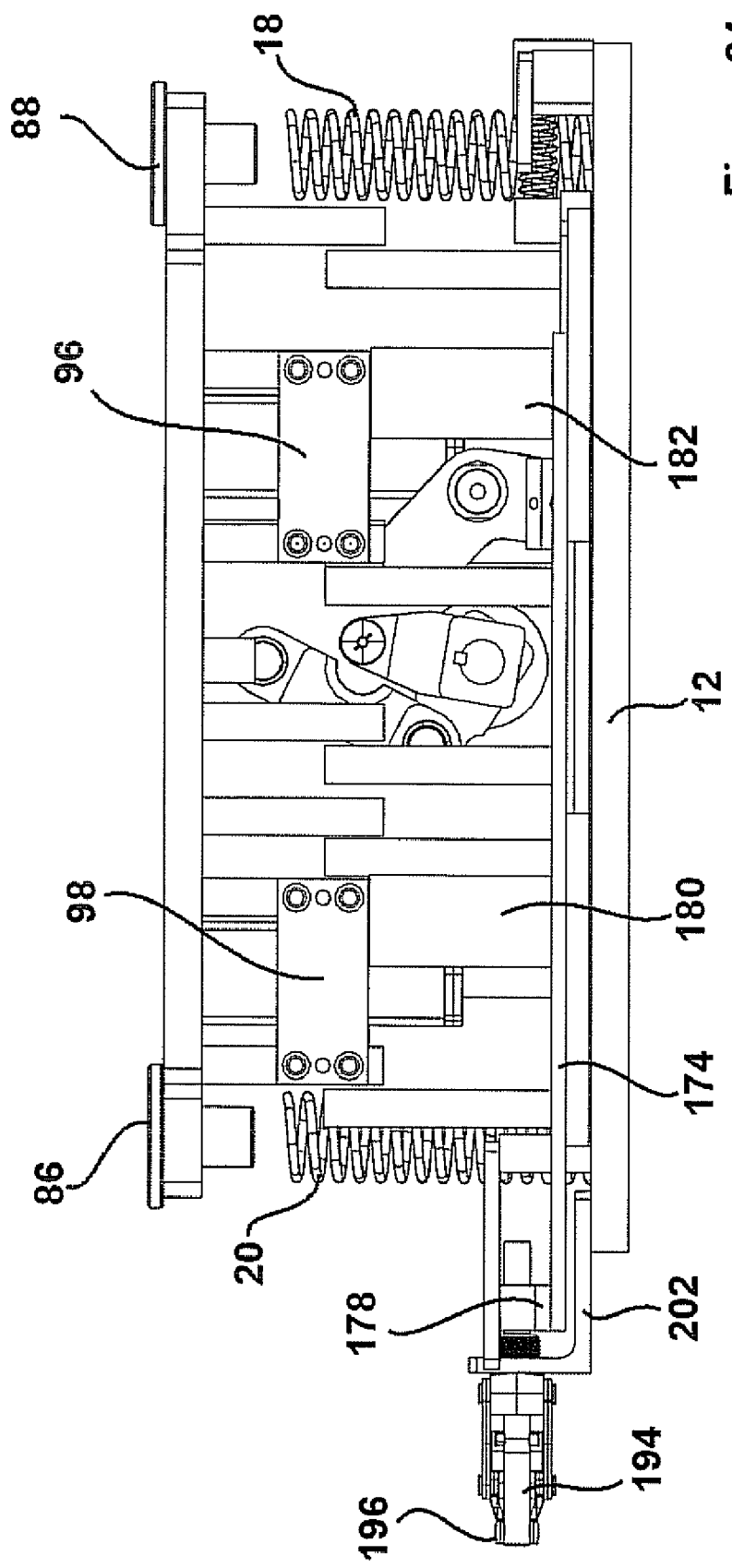
FIG. 24 is a further side view illustration succeeding FIGS. 22 and 23 and during which the Geneva crank mechanism initiates a return actuated stroke to linearly offset the opposing vertical supports of the upper and lower frame subassemblies, causing the upper frame assembly to descend to a second intermediate height position, at which crosswise supports associated with the upper frame assembly and positioned beyond the perimeter of the lower frame assembly engage the column supports associated with the limit stroke bracket.

FIG. 23 is a perspective view of the assembly shown in FIG. 22 and better showing the outwardly displaced position of the limit stroke bracket which, upon being translated, causes the columns supports (see at 180 & 182) brought into alignment with the outwardly horizontally and secured crosswise supports 96 and 98. Proceeding to FIG. 24, a further side view illustration succeeding FIGS. 22 and 23 is shown and during which the crank mechanism initiates a return actuated stroke in which the first linkage (again rotary driven arm 134 and interconnected linkage arm 136) lifts the upper frame walls above the lower frame walls and progressively linearly offsets the opposing the walls, whereupon the upper frame is caused to descend to a second intermediate height position, at which the crosswise supports (a pair of which are again illustrated 96 and 98) associated with the upper frame assembly 72 engage the vertical column supports (a corresponding pair of which are again illustrated at 180 and 182) associated with the limit stroke bracket.

Finally, and referring to FIG. 25, a perspective view of the intermediate height position (such as at 1" elevation as opposed to a maximum elevation of 3") and in which the pluralities of opposing walls 56-66 and 74-84 of the lower and upper frames are offset/partially nested, thereby permitting the side disposed and outwardly located pairs of crosswise horizontal supports (one side again shown at 96 and 98) to seat upon the limit stroke bracket shifted and supported vertical columns (the visible pair again shown at 180 and 182 and supporting the upper frame supports 96 and 98 and, consequently, the upper frame 72 in its intermediate height position). Repetition of the pallet lift cycle is accomplished by reverse lifting the upper frame 72, via the crank mechanism 114 (such that the horizontal supports elevate from the vertical columns), following which pivoting of the handle 196 causes the connecting rod 194 to return displace the limits stroke bracket 172 to the position initially shown at FIG. 21, whereupon continued reverse crank rotation will return the pallet lift to the initial position of FIG. 16.

It is also contemplated that the pallet lift can, according to the desired variant, repetitively cycle between the initial and maximum height positions (without employing the limit stroke bracket), however the provision of an additional and intermediate height position provides for additional flexibility in the design of forming/production steps (see again at 8 in FIG. 1), and which may be unduly limited by two position cycling. It is further understood that the scale and height positions made possible by the pallet design are not limited to that disclosed herein.

Having described my invention, other and additional preferred embodiments will become apparent to those skilled in the art to which it pertains, and without deviating from the scope of the appended claims.

I claim:

1. A pallet lift incorporated into a conveyor driven process, comprising:
    a planar base upon which is mounted a rotary driven crank;
    a lower frame supported upon said base and including a first plurality of upwardly extending and spaced apart walls;
    an upper frame including a second plurality of downwardly extending and spaced apart walls which nest in offsetting fashion with said first plurality of walls in an initial position and which are aligned with and supported upon said first plurality of walls in an elevated position; and
    said crank including a first linkage elevating said upper frame between said initial and elevated positions, said crank further including a second linkage successively displacing said lower frame so that said first plurality of walls align with said second plurality of walls and prior to said first linkage lowering said upper frame to seat upon said lower frame.

2. The invention as described in claim 1, further comprising an interior aperture defined in said lower frame for situating therein said crank, at least one biasing spring extending horizontally inwardly from an end projection associated with said base and biasing said lower frame in a direction opposing said second linkage.

3. The invention as described in claim 1, said first linkage further comprising a lower rotary driven arm and an upper pivotally engaged arm, an extending end of said upper arm pivotally engaging an underside located projection of said upper frame.

4. The invention as described in claim 3, said second linkage further comprising a rotary driven and generally elongate member exhibiting an arcuate end surface and which is coaxially mounted in both an outward and angularly offset fashion relative said rotary driven arm of said first linkage.

5. The invention as described in claim 4, further comprising a generally boomerang shaped transfer linkage pivotally secured at a location above said planar base and including an upper portion contacted by said rotary driven elongate member, said transfer linkage further comprising a lower portion engaging said lower frame.

6. The invention as described in claim 1, further comprising a generally "U" shaped limit stroke bracket displaceably supported upon said planar base, spaced apart sides of said limit stroke bracket each including at least one column support located outward from said lower frame, said upper frame including at least one projecting crosswise support secured horizontally to side edges of selected downwardly extending and spaced apart walls and such that, upon linearly displacing said limit stroke bracket following said upper frame being displaced to said elevated position, said column supports align underneath said crosswise supports, following which return actuating of said crank causes said horizontally extending crosswise supports to seat upon said column supports to reposition said upper frame at an intermediate elevated position.

7. The invention as described in claim 6, said limit stroke bracket further comprising a central elongate portion interconnecting said spaced apart sides, a linearly displaceable rod associated with a cam pivoting handle mechanism affixed to said base, said rod connecting to said elongate portion and, upon pivoting said handle, displacing said column supports.

8. The invention as described in claim 1, further comprising a rotary drive cylinder operating said crank.

9. The invention as described in claim 1, further comprising a pair of vertical guide posts projecting from said base and aligning through seating locations associated with said upper and lower frames.

10. The invention as described in claim 1, further comprising first and second vertically extending cushioning springs extending upwardly from said base and seating through apertures defined in underside secured guide posts associated with said upper frame.

11. The invention as described in claim 1, further comprising an uppermost platen surface associated with said upper frame against which is affixed one or more workpieces.

12. The invention as described in claim 11, further comprising outer rails associated with a conveyor assembly and between which said lift is located.

13. The invention as described in claim 1, said first linkage actuating through a 120° angular rotation and said second linkage actuating through a successive 30° rotation.

14. The invention as described in claim 5, said lower portion of said transfer linkage further comprising a recessed outer surface within which is seated a surface mounted and horizontally extending pin associated with said lower frame.

15. A pallet lift incorporated into a conveyor driven process, comprising:
a planar base upon which is mounted a rotary driven crank;
a lower frame supported upon said base and including a first plurality of upwardly extending and spaced apart walls;
an upper frame including a second plurality of downwardly extending and spaced apart walls which nest in offsetting fashion with said first plurality of walls in an initial position and which are aligned with and supported upon said first plurality of walls in an elevated position;
said crank including a first linkage having a lower rotary driven arm and an upper pivotally engaged arm for elevating said upper frame between said initial and elevated positions, said crank further including a second linkage having a rotary driven and elongate member with an arcuate end surface and which is coaxially mounted in outward and angularly offset fashion relative to said rotary driven arm of said first linkage for successively displacing said lower frame so that said first plurality of walls align with said second plurality of walls; and
a generally "U" shaped limit stroke bracket displaceably supported upon said planar base, spaced apart sides of said limit stroke bracket each including at least one column support located outward from said lower frame, said upper frame including at least one projecting crosswise support secured horizontally to side edges of selected downwardly extending and spaced apart walls and such that, upon linearly displacing said limit stroke bracket following said upper frame being displaced to said elevated position, said column supports align underneath said crosswise supports, with return actuating of said crank causing said horizontally extending crosswise supports to seat upon said column supports to reposition said upper frame at an intermediate elevated position.

16. The invention as described in claim 15, further comprising an interior aperture defined in said lower frame for situating therein said crank, at least one biasing spring extending horizontally inwardly from an end projection associated with said base and biasing said lower frame in a direction opposing said second linkage.

17. The invention as described in claim 16, further comprising a generally boomerang shaped transfer linkage pivotally secured at a location above said planar base and including an upper portion contacted by said rotary driven elongate member, said transfer linkage further comprising a lower portion engaging said lower frame.

18. The invention as described in claim 15, said limit stroke bracket further comprising a central elongate portion interconnecting said spaced apart sides, a linearly displaceable rod associated with a cam pivoting handle mechanism affixed to said base, said rod connecting to said elongate portion and, upon pivoting said handle, displacing said column supports.

19. The invention as described in claim 15, further comprising a pair of vertical guide posts projecting from said base and aligning through seating locations associated with said upper and lower frames, first and second vertically extending cushioning springs extending upwardly from said base and seating through apertures defined in underside secured guide posts associated with said upper frame and, in combination with said guide posts, providing for repetitive raising and lowering of said upper frame.

20. A pallet lift incorporated into a conveyor driven process, comprising:
a base;
a lower frame displaceably supported upon said base and including a first plurality of upwardly extending and spaced apart walls;
an upper frame including a second plurality of downwardly extending and spaced apart walls which nest in offsetting fashion with said first plurality of walls in an initial position;
a crank associated with said base and including a first rotary driven linkage for elevating said upper frame from an initial position to an elevated position in which said second walls are located above said first walls, said crank further including a second rotary driven linkage for successively displacing said lower frame to cause said first plurality of walls to align with said second plurality of walls in said elevated position and concurrent with said first linkage reverse lowering said upper frame to seat upon said lower frame.

* * * * *